United States Patent
Hu et al.

(10) Patent No.: US 12,298,963 B1
(45) Date of Patent: May 13, 2025

(54) OPTIMIZED HAMPEL FILTERING FOR OUTLIER DETECTION

(71) Applicant: SAS Institute Inc., Cary, NC (US)

(72) Inventors: Hongtao Hu, Cary, NC (US); Mahesh V Joshi, Cary, NC (US)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 18/932,008

(22) Filed: Oct. 30, 2024

Related U.S. Application Data

(60) Provisional application No. 63/663,942, filed on Jun. 25, 2024, provisional application No. 63/651,608, filed on May 24, 2024, provisional application No. 63/647,948, filed on May 15, 2024.

(51) Int. Cl.
| | |
|---|---|
| G06F 16/23 | (2019.01) |
| G06F 7/08 | (2006.01) |
| G06F 16/22 | (2019.01) |
| G06F 16/2455 | (2019.01) |

(52) U.S. Cl.
CPC ............ *G06F 16/2365* (2019.01); *G06F 7/08* (2013.01); *G06F 16/22* (2019.01); *G06F 16/24558* (2019.01)

(58) Field of Classification Search
None
See application file for complete search history.

(56) References Cited

U.S. PATENT DOCUMENTS

| | | | |
|---|---|---|---|
| 9,628,499 B1* | 4/2017 | Yu | H04L 63/1416 |
| 11,316,764 B1* | 4/2022 | Zhou | H04L 41/142 |
| 2018/0046599 A1* | 2/2018 | Nagarajan | G06N 3/08 |
| 2019/0278443 A1* | 9/2019 | Mashayekhi | G06Q 40/06 |
| 2021/0065187 A1* | 3/2021 | Huang | G06Q 20/4016 |
| 2022/0198264 A1* | 6/2022 | Guo | G06N 3/08 |
| 2023/0216746 A1* | 7/2023 | Ucci | G06N 7/01 |
| | | | 709/224 |
| 2023/0305904 A1* | 9/2023 | Lowe | G06F 11/3414 |

OTHER PUBLICATIONS

"Pracma: Practical Numerical Math Functions" CRAN—Package pracma; Version 2.4.4, retrieved from: https://cran.r-project.org/web/packages/pracma/index.html, retrieved on May 15, 2024, 2 pages.

(Continued)

*Primary Examiner* — Irene Baker
(74) *Attorney, Agent, or Firm* — Dority & Manning, P.A.

(57) ABSTRACT

A new value is written from a dataset to a data structure comprising a set of sorted values. The new value replaces an oldest value and is inserted in a sorted position. The data structure is modified by subtracting a median value from each value of the set of sorted values to obtain sorted signed deviation values. The sorted signed deviation values are segmented to obtain data substructures comprising subsets of sorted absolute deviation values. A binary search is performed on the data substructures to identify a median absolute deviation value. A difference is computed between a particular value and the median value, and based on whether the difference is less than a threshold value computed from the median absolute deviation value, an outlier decision output is generated indicative of whether the particular value comprises an outlier value.

30 Claims, 23 Drawing Sheets

(56) References Cited

OTHER PUBLICATIONS

Hampel 1.0.2 "Python Implementation of Hampel Filter" retrieved from: https://pypi.org/project/hampel/, retrieved on May 15, 2024, 5 pages.
"The Hampel Identifier: Robust Outlier Detection in a Time Series; SAS Blogs"; retrieved from: https://blogs.sas.com/content/iml/2021/06/01/hampel-filter-robust-outliers.html, Jun. 1, 2021, 8 pages.
"Filtering Outliers—How to Make Median-Based Hampel Function Faster?"; retrieved from: https://stackoverflow.com/questions/46819260/filtering-outliers-how-to-make-median-based-hampel-function-faster/51731332#51731332, retrieved on May 15, 2024, 4 pages.
Package 'pracma' "Practical Numerical Math Functions," Nov. 10, 2023, 394 pages.
Hampel "Outlier Removal Using Hampel Identifier", MATLAB hampel, retrieved from: https://www.mathworks.com/help/signal/ref/hampel.html, retrieved on May 15, 2024, 13 pages.
Diachkov, "Outlier Detection in R: Hampel Filter for time series," Data and Beyond, Feb. 2, 2024, 9 pages.
"Outlier Detection with Hampel Filter," Medium; retrieved from: "https://github.com/erykml/medium_articles/blob/master/Machine Learning/outlier_detection_hampel_filter.ipynb," retrieved on Oct. 10, 2024, 9 pages.

\* cited by examiner

OPTIMIZED HAMPEL FILTERING FOR OUTLIER DETECTION

PRIORITY CLAIM

This application claims the benefit of, and priority based on, 35 U.S.C. § 119 to U.S. Provisional Application No. 63/663,942, filed Jun. 25, 2024, U.S. Provisional Application No. 63/651,608, filed May 24, 2024, and U.S. Provisional Application 63/647,948, filed May 15, 2024, disclosures of each of which are incorporated herein by reference in their entirety.

BACKGROUND

Outlier detection is a critical task in a variety of fields that leverage data analysis techniques. For example, outlier detection can be critically important in domains that utilize functional data (e.g., time series data, etc.), such as finance, healthcare, and industrial processes. Anomalies or outliers in time series data can signify significant events, errors in data collection, or potential insights that warrant further investigation. Various types of filters (e.g., decision filters) can be applied to data to facilitate outlier detection, such as the Hampel filter. The Hampel filter is a filter that leverages the Median Absolute Deviation (MAD) of a sliding window to detect and identify outlier data points.

SUMMARY

The proposed improved Hampel filtering process for outlier detection optimizes the collaboration between the main computational steps to achieve a reduced time complexity of O(nm) compared to O(n(m log(m))) for traditional approaches, where n is the series length and m is the sliding window size, which results in faster computational times. The method can handle missing data. The method supports multiple distribution types (e.g., non-Gaussian distributions, etc.) beyond the Gaussian distribution.

This summary is not intended to identify only key or essential features of the described subject matter, nor is it intended to be used in isolation to determine the scope of the described subject matter. The subject matter should be understood by reference to appropriate portions of the entire specification of this patent application, any or all drawings, and each claim.

One example implementation of the present disclosure is directed to a computer-program product tangibly embodied in a non-transitory machine-readable storage medium, the computer-program product including instructions operable to cause a computing device to perform operations. The operations include accessing a memory storing a data structure, the data structure comprising a set of sorted values sampled from a plurality of values of a dataset. The operations further include writing a new value from the plurality of values to the data structure, wherein the new value replaces an oldest value of the set of sorted values, and wherein the new value is inserted in a sorted position within the set of sorted values different than an original position of the oldest value. The operations include modifying the data structure by subtracting a median value of the set of sorted values from each value of the set of sorted values to obtain a corresponding set of sorted signed deviation values. The operations include segmenting the set of sorted signed deviation values of the data structure at a segmentation point to obtain a first data substructure comprising a first subset of sorted absolute deviation values and a second data substructure comprising a second subset of sorted absolute deviation values, wherein the segmentation point is positioned between a negative signed value and a non-negative value within the set of sorted signed deviation values. The operations include performing a binary search on the first data substructure and the second data substructure to identify a median absolute deviation value. The operations include computing a difference between a particular value of the set of sorted values and the median value of the set of sorted values, wherein the particular value comprises a value from the dataset being evaluated for an outlier decision. The operations include, based on whether the difference is less than a threshold value computed from the median absolute deviation value, generating an outlier decision output indicative of whether the particular value of the set of sorted values comprises an outlier value.

Another example implementation of the present disclosure is directed to a system including one or more data processors and a non-transitory computer-readable storage medium containing instructions which, when executed on the one or more data processors, cause the one or more data processors to access a memory storing a data structure, the data structure comprising a set of sorted values sampled from a plurality of values of a dataset. The one or more data processors are further to write a new value from the plurality of values to the data structure, wherein the new value replaces an oldest value of the set of sorted values, and wherein the new value is inserted in a sorted position within the set of sorted values different than an original position of the oldest value. The one or more data processors are further to modify the data structure by subtracting a median value of the set of sorted values from each value of the set of sorted values to obtain a corresponding set of sorted signed deviation values. The one or more data processors are further to segment the set of sorted signed deviation values of the data structure at a segmentation point to obtain a first data substructure comprising a first subset of sorted absolute deviation values and a second data substructure comprising a second subset of sorted absolute deviation values, wherein the segmentation point is positioned between a negative signed value and a non-negative value within the set of sorted signed deviation values. The one or more data processors are further to perform a binary search on the first data substructure and the second data substructure to identify a median absolute deviation value. The one or more data processors are further to compute a difference between a particular value of the set of sorted values and the median value of the set of sorted values, wherein the particular value comprises a value from the dataset being evaluated for an outlier decision. The one or more data processors are further to, based on whether the difference is less than a threshold value computed from the median absolute deviation value, generate an outlier decision output indicative of whether the particular value of the set of sorted values comprises an outlier value.

Another example implementation of the present disclosure is directed to a computer-implemented method. The method includes accessing, by a computing system comprising one or more processor devices, a memory storing a data structure, the data structure comprising a set of sorted values sampled from a plurality of values of a dataset. The method further includes writing, by the computing system, a new value from the plurality of values to the data structure, wherein the new value replaces an oldest value of the set of sorted values, and wherein the new value is inserted in a sorted position within the set of sorted values different than an original position of the oldest value. The method further includes modifying, by the computing system, the data structure by subtracting a median value of the set of sorted values from each value of the set of sorted values to obtain a corresponding set of sorted signed deviation values. The method further includes segmenting, by the computing system, the set of sorted signed deviation values of the data structure at a segmentation point to obtain a first data substructure comprising a first subset of sorted absolute deviation values and a second data substructure comprising a second subset of sorted absolute deviation values, wherein the segmentation point is positioned between a negative signed value and a non-negative value within the set of sorted signed deviation values. The method further includes performing, by the computing system, a binary search on the first data substructure and the second data substructure to identify a median absolute deviation value. The method further includes computing, by the computing system, a difference between a particular value of the set of sorted values and the median value of the set of sorted values, wherein the particular value comprises a value from the dataset being evaluated for an outlier decision. The method further includes, based on whether the difference is less than a threshold value computed from the median absolute deviation value, generating, by the computing system, an outlier decision output indicative of whether the particular value of the set of sorted values comprises an outlier value.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
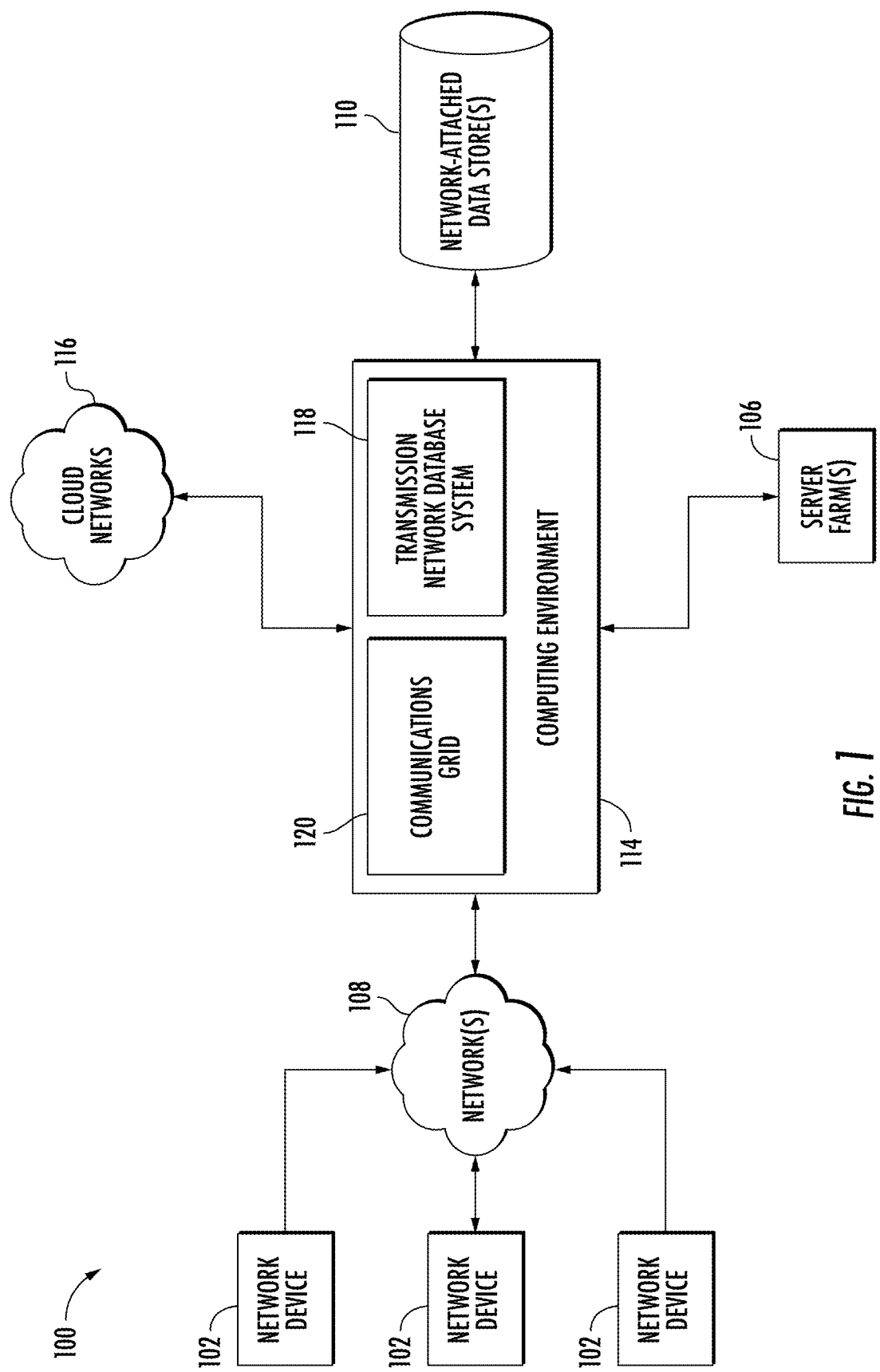
FIG. 1 illustrates a block diagram that provides an illustration of the hardware components of a computing system, according to some embodiments of the present technology.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Outlier detection is a critical task in a variety of fields that leverage data analysis techniques. For example, outlier detection for functional data, such as time series data, is a key task in domains such as finance, healthcare, and industrial processes. Anomalies or outliers in time series data can signify significant events, errors in data collection, or potential insights that warrant further investigation. Various types of filters (e.g., decision filters) can be applied to data to facilitate outlier detection, such as the Hampel filter. The Hampel filter, also known as the Hampel identifier, is a filter that leverages the Median Absolute Deviation (MAD) of a sliding window to detect and identify outlier data points.

To compute a Hampel filter for a dataset in accordance with conventional approaches, a computing system can first initiate a sliding window data structure (e.g., a vector, etc.) that iteratively "slides" over the values of the dataset. As described herein, values from a dataset may be referred to interchangeably as data elements, observations, etc. A "sliding window", as described herein, refers to a technique used to process sequential data within a computing system, such as data stored in arrays (e.g., lists, sequences, etc.) or other sequential data structures. When using a sliding window, a subset of elements or values of a dataset are stored and referred to as a "window." The "window" moves incrementally over the dataset, and when the window moves at each iteration, an old value is removed from the window and a new value is added to the window. As the window slides forward, values may enter or exit the window incrementally.

For example, assume the sliding window starts at values 0-5 in a dataset. Once the Hampel filter computation is completed to determine whether one value of the values 0-4 is an outlier (e.g., the third value, etc.), the computing system can remove the oldest value from the sliding window. The computing system can sequentially increment the sliding window to values 1-5 of the dataset by adding a new value (e.g., value 5) and performing the Hampel filter computation to determine whether one of the values 1-5 is an outlier (e.g., the third value). The computing system can continue to increment the sliding window until the Hampel filter has been applied to the dataset.

Specifically, the computing system can perform the following operations to compute the Hampel filter for the values included in the sliding window using a conventional Hampel filtering process:

A. Sort observations (i.e., values) $O_{t-w}, \ldots, O_t, O_{t+w}$ included in the sliding window;

B. Compute a median $m_t$ from observations $O_{t-w}, \ldots, O_t, O_{t+w}$ in the sliding window;

C. Compute the absolute deviation $|O_t - m_t|$ for all window observations;

D. Sort absolute deviation values for all window observations;

E. Compute the MAD for the window observations as $MAD_t = \text{median}(|O_t - m_t|)$;

F. Compute the Standard Deviation Estimation as $\hat{o} = k*MAD$, where k is a scale factor associated with the input data distribution;

G. Compute the threshold $\lambda = n_o * k$, where $n_o$ represents a number of standard deviations (i.e., how many times the standard deviation);

H. Compute whether the considered observation differs from the window median by greater than or equal to the threshold $\lambda$ multiplied by the MAD estimate; and I. Compute the outlier decision as:

$$\text{outlier } (O_t) = \begin{cases} 1, |O_t - m_t| \geq \lambda * MAD_t \\ 0 \text{ otherwise} \end{cases}$$

However, the computational cost of performing conventional Hampel filter processes (or related computations) can be prohibitively expensive due to the sorting operations (e.g., operations A and D) required prior to computing the median and MAD (e.g., operations B and E). For example, conventional approaches that utilize efficient sorting algorithms, such as QuickSort, demonstrate O(nm log(m)) computational complexity when utilized in the context of Hampel filter computations. Some conventional approaches combine the Quicksort algorithm with a "Dual-heap" sorting algorithm to reduce computational complexity. However, this combination only reduces the computational complexity of the sorting operation for computing the median from O(nm log(m)) to O(n(log(m)+m)), and does nothing to reduce the computational complexity of the sorting operation for computing the MAD. As such, the total computational cost of conventional Hampel filtering approaches remains prohibitively expensive.

Conventional approaches to Hampel filter computations exhibit a variety of other deficiencies. In particular, conventional Hampel filter computations exhibit poor performance when applied to data with missing or null values (i.e., sparse data), or cannot be applied to such data at all. For another example, many, if not all, conventional Hampel filter computations cannot be applied to datasets with non-Gaussian data distributions. In conjunction, these deficiencies can severely limit the effectiveness and/or applicability of conventional Hampel filter computations to a substantial proportion of datasets, and in particular, time-series datasets.

Accordingly, implementations described herein propose improved Hampel filtering for outlier detection. More specifically, a computing system (e.g., a network node, computing device, processor device, etc.) can access a memory storing a data structure (e.g., a vector, some other data structure that serves as a sliding window, etc.). The data structure can include a set of sorted values sampled from a plurality of values for a dataset. The computing system can write a new value from the dataset to the data structure. When written, the new value can replace whatever value is "oldest" in the data structure (e.g., the least recent value to be added to the data structure, etc.). The new value can be inserted in a sorted position within the set of sorted values that is different from the original position of the oldest value. For example, the computing system can perform an efficient search operation (e.g., a binary search) to locate the oldest value and replace the oldest value with the new value.

For example, assume that, prior to the computing system accessing the memory, the set of sorted values were unsorted values sampled sequentially from the dataset (e.g., values 0-5 of the dataset). Further, assume that the computing system performed a first iteration of the conventional Hampel filtering process described previously. As part of the Hampel filtering process, the computing system can perform an initial sort with an initial use of a conventional sorting algorithm (e.g., Quicksort, Dual-heap, etc.) to obtain the set of sorted values, such as the sorting process described above with regards to operation A. When the computing system increments the sliding window to the next value in the dataset, the computing system can write the new value from the dataset to the data structure.

The computing system can modify the data structure by subtracting a median value of the set of sorted values from each value of the set of sorted values to obtain a corresponding set of signed deviation values. For example, if the data structure includes a set of sorted values [1, 2, 4, 5, 8], the computing system can modify the data structure by subtracting the median (e.g., 4) from each value to obtain a set of sorted signed deviation values [−3, −2, 0, 1, 4]. In this manner, the signed deviation values obtained by the computing system are obtained in a sorted order.

The computing system can segment the set of sorted signed deviation values at a segmentation point (e.g., a point between a negative number and a non-negative number, etc.) to segment the sorted signed deviation values into first and second subsets of the sorted signed deviation values. The first and second subsets can be stored to first and second data substructures, respectively. Once stored, the first subset of sorted absolute deviation values can be converted to a first subset of sorted absolute deviation values (e.g., from [−3, −2] to [2, 3]. Similarly, the first subset of sorted absolute deviation values can be converted to a first subset of sorted absolute deviation values.

To follow the previous example, the computing system can segment the set of sorted signed deviation values [−3, −2, 0, 1, 4] at a point between a negative value and a non-negative value (e.g., between −2 and 0) to obtain a first subset of sorted signed deviation values [−3, −2] and a second subset of sorted signed deviation values [0, 2, 3]. The computing system can compute the first subset of sorted absolute deviation values [2, 3] from the first subset of sorted signed deviation values [−3, −2] by removing signs from signed values and reversing the order of the first subset of sorted signed deviation values. In such fashion, the computing system can compute the first subset of sorted absolute deviation values without needing to perform a sorting operation.

Similarly, because the second subset of signed deviation values [0, 1, 4] is segmented at a segmentation point between a negative number and a non-negative number, and because the second subset of sorted signed deviation is sorted, the computing system can use the second subset of sorted signed deviation values [0, 1, 4] as the subset of sorted absolute deviation values without adding any computational complexity to the process. In this manner, the computing system can further reduce computational complexity in comparison to conventional approaches.

The computing system can perform a binary search on the first data substructure (e.g., the substructure that includes the first subset of sorted absolute deviation values) and the second data substructure (e.g., the substructure that includes the second subset of sorted absolute deviation values). The binary search can identify a MAD value for the set of sorted values. In particular, the computing system can perform a binary search for the values representing the "border" between the sorted absolute deviation values when split at the median value. To do so, the computing system can perform the search on the substructure that includes the fewest values of the two substructures to identify one of the two bordering values, thus reducing computational complexity in comparison to using the larger of the two substructures. The computing system can then derive the other bordering value from the first bordering value and determine the highest of the two values to be the MAD value.

The computing system can compute a difference between a particular value (e.g., the "center" value being evaluated within the sliding window) and the median value of the set of sorted values. Based on the difference between the particular value and the median value being greater than a threshold value computed from the MAD value, the computing system can generate an outlier decision output. The outlier decision output can indicate whether the particular value of the set of sorted values is an outlier value.

To follow the previous example, the computing system can perform the binary search on the first subset of sorted absolute signed deviation values [2, 3] and the second subset of sorted absolute signed deviation values [0, 1, 4] to identify a median absolute deviation value of 2. The computing system can compute a difference of 1 between the particular value (e.g., 5) and the median value of 4. The computing system can further compute a threshold value based on the MAD value. For example, the computing system can multiply the MAD by a controllable variable, such as a user-configurable number of standard deviations (e.g., 1 standard deviation, 2 standard deviations, etc.). For another example, the computing system may multiply the MAD by a particular scale factor associated with the particular data distribution type of the dataset to estimate the standard deviation for the set of sorted values. The computing system can then multiply the standard deviation by the controllable variable to obtain the threshold value. For example, the scale factor associated with a Gaussian distribution (e.g., a scale factor of 1.4826) may be different than the scale factor associated with a non-Gaussian distribution such as a Laplace distribution (e.g., a scale factor of 2.04). As such, if the dataset type can be identified, the scale factor associated with that data type can be used to estimate the standard deviation.

Assume that the data distribution type is a Laplace distribution with a scale factor of 2.04. The computing system can compute the threshold value by first estimating the standard deviation of the values by multiplying a MAD value of 2 by the scale factor of 2.04 to obtain an estimated standard deviation of 4.08. The threshold value can be computed by multiplying the standard deviation of 2 by a user-configurable number of standard deviations of 1 to obtain a threshold value of 4.08. Based on a difference between the value being evaluated and the median value (e.g., 2) being less than the threshold value of 4.08, the computing system can generate an outlier decision output indicating that the particular value is not an outlier value. In such fashion, implementations described herein can substantially reduce the computational costs associated with the Hampel filtering process.

Aspects of the present disclosure provide a number of technical effects and benefits. As one example technical effect and benefit, implementations described herein substantially reduce the computational complexity of the Hampel filtering process. For example, as described above, conventional approaches to Hampel filtering perform an expensive sorting algorithm (e.g., Quicksort, Dual-heap, etc.) twice at each iteration of the sliding window: once so that the median value can be computed for the window, and again so that the MAD can be computed for the window (e.g., operations A and D above). In turn, each of these sorting operations incur a computational complexity of O(nm log(m)). However, by accessing, writing, and modifying a data structure that stores the sorted values as described above, implementations of the present disclosure can maintain a sorted order of values as the sliding window iterates over the dataset, thus obviating the need to perform expensive sort operations at each iteration. By obviating these sorting operations, implementations described herein reduce the computational complexity of the Hampel filter process from O(nm log(m)) to O(nm), thus reducing associated expenditure of computational resources by orders of magnitude (e.g., power, memory, storage, compute cycles, bandwidth, etc.). These differences in computational complexity are illustrated in Table 1 below, which refers to the implementations of the present disclosure as the "improved Hampel filter."

TABLE 1

| | Median Sort Operation Complexity | M.A.D. Sort Operation Complexity | Total Operation Complexity |
|---|---|---|---|
| Quicksort (open-src) | O(nm log(m)) | O(nm log(m)) | O(nm log(m)) |
| Dual-heap + Quicksort | O(n(log(m) + m)) | O(nm log(m)) | O(nm log(m)) |
| Improved Hampel Filter | O(n(log(m) + m)) | O(n log(m)) | O(nm) |

As another example, the reduction in computational complexity provided by the implementations described herein further enable the application of the Hampel filter in certain scenarios in which conventional Hampel filtering approaches cannot be applied, such as time-sensitive or resource-sensitive scenarios. For example, the relatively slow speed of a conventional Hampel filtering process can be too slow for use in certain time-sensitive processes, such as real-time sensor data processing in Software-defined Vehicles (SDVs) or robotics applications, real-time monitoring of information for threat detection, etc. (e.g., due to the O(n(log(m)+m)) time complexity, etc.). Similarly, the computational cost of conventional Hampel filtering processes can limit the filter's applicability in resource-constrained environments, such as mobile devices, Augmented Reality (AR)/Virtual Reality (VR) devices, aerospace devices, etc. However, by reducing the computational complexity and improving the speed of Hampel filtering, implementations described herein enables usage of the filter in time-sensitive and/or resource-constrained scenarios.

Such implementations can be implemented as hardware, software, or a combination thereof. For example, the optimized Hampel filter described herein can be implemented as a circuit in a computing or processor device (e.g., a Field-Programmable Gate Array (FPGA), Application-specific Integrated Circuit (ASIC), microcontroller, a digital signal processor, etc.). For another example, the optimized Hampel filter described herein can be implemented as software or software instructions (e.g., a program, module, function, process, procedure, application, etc.).

EXAMPLE SYSTEMS

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
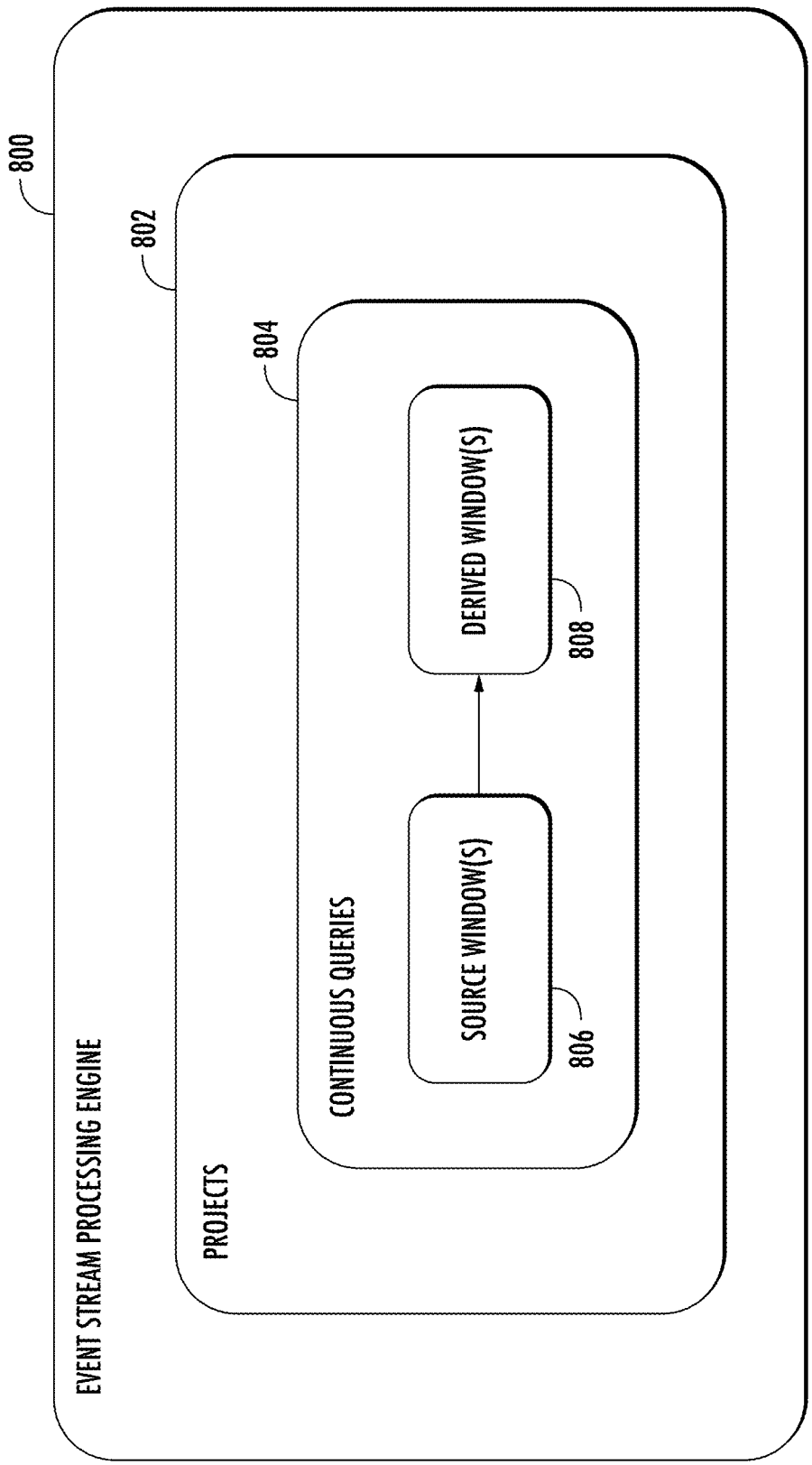
FIG. 8 illustrates a block diagram including components of an Event Stream Processing Engine (ESPE), according to embodiments of the present technology.
Figure 9:
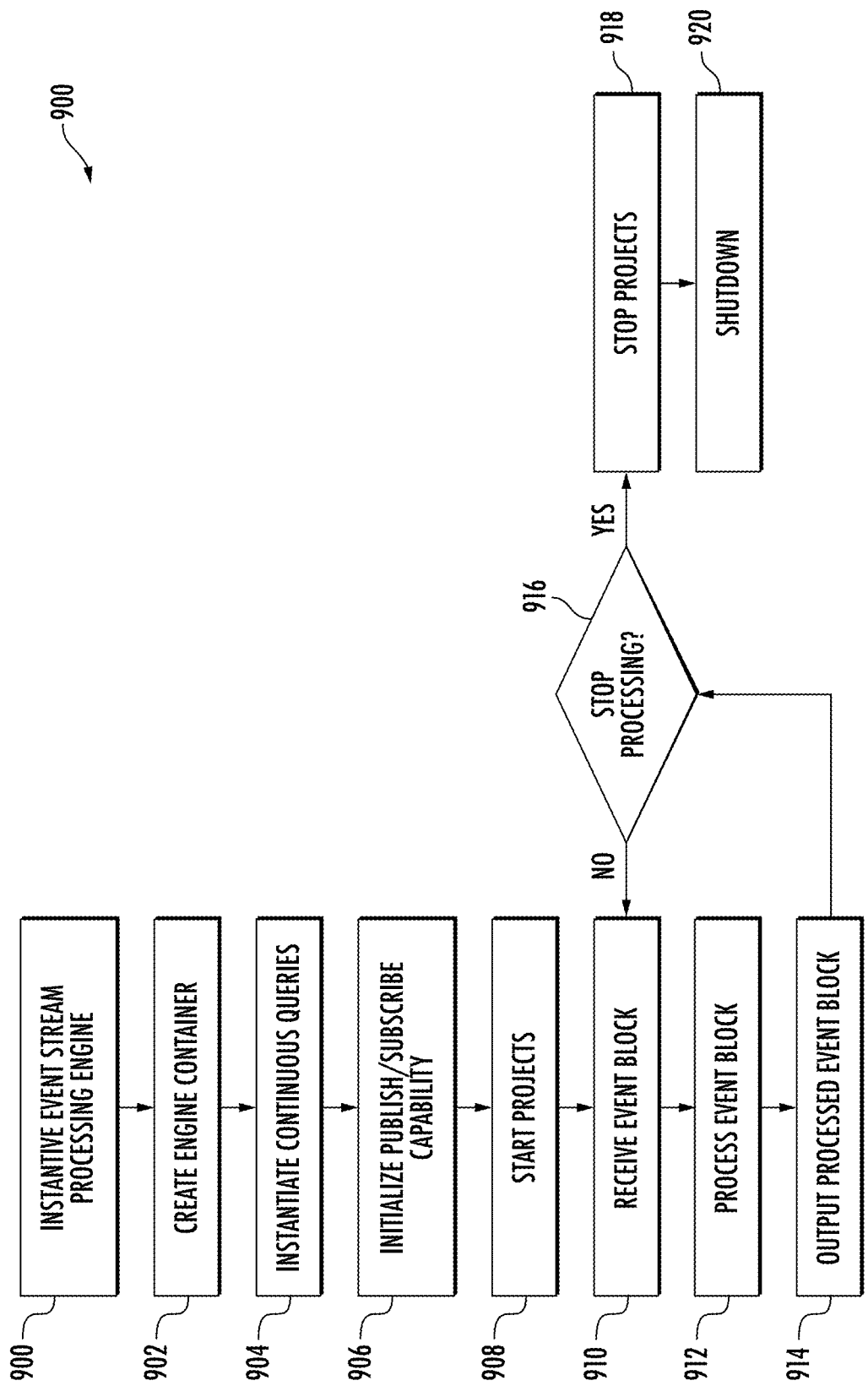
FIG. 9 illustrates a flow chart showing an example process including operations performed by an event stream processing engine, according to some embodiments of the present technology.
Figure 10:
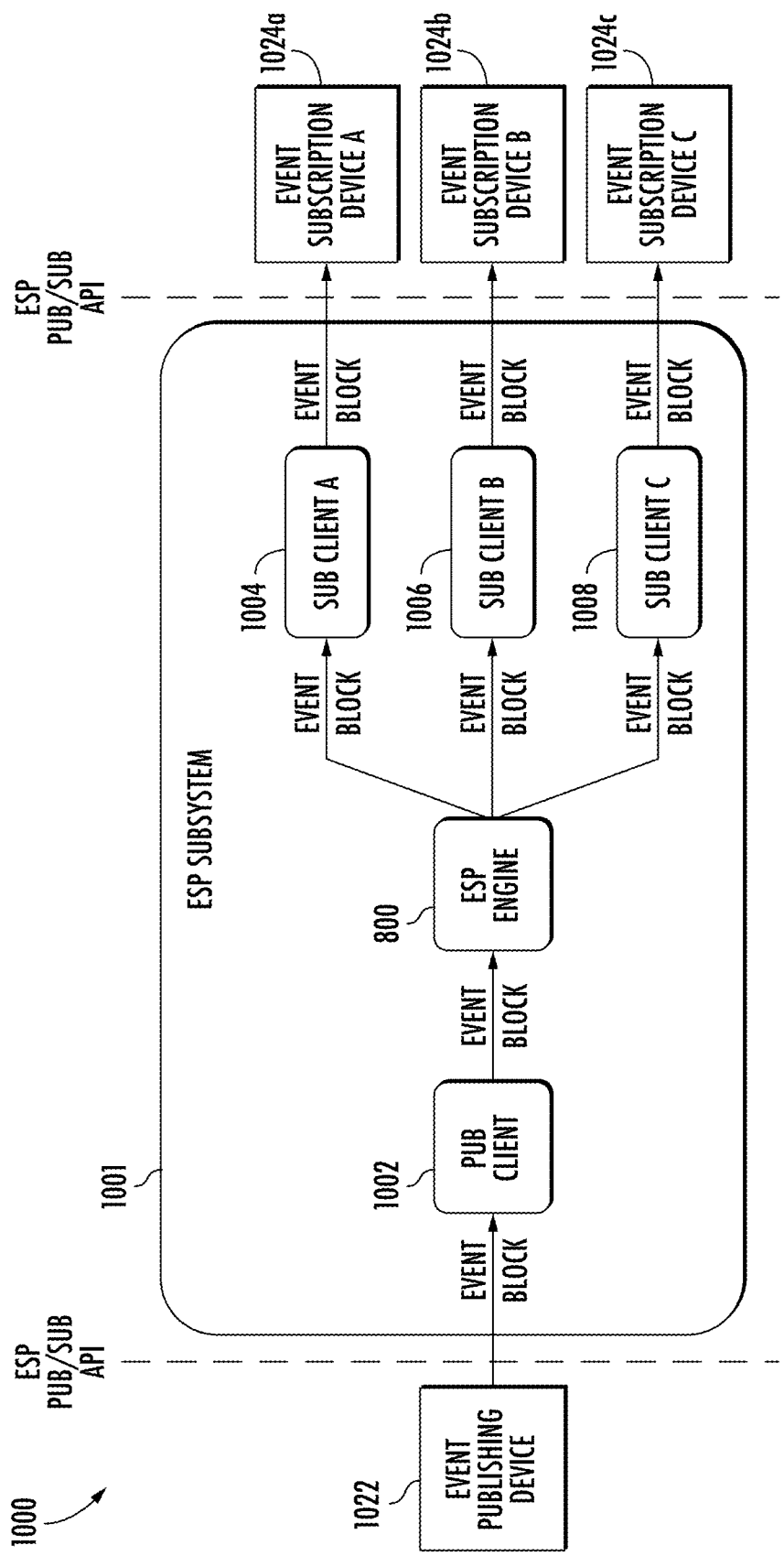
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time. For another example, sensor data may be processed using filtering operations, such as the improved Hampel filter process described herein (e.g., with regards to FIGS. 14-21).

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
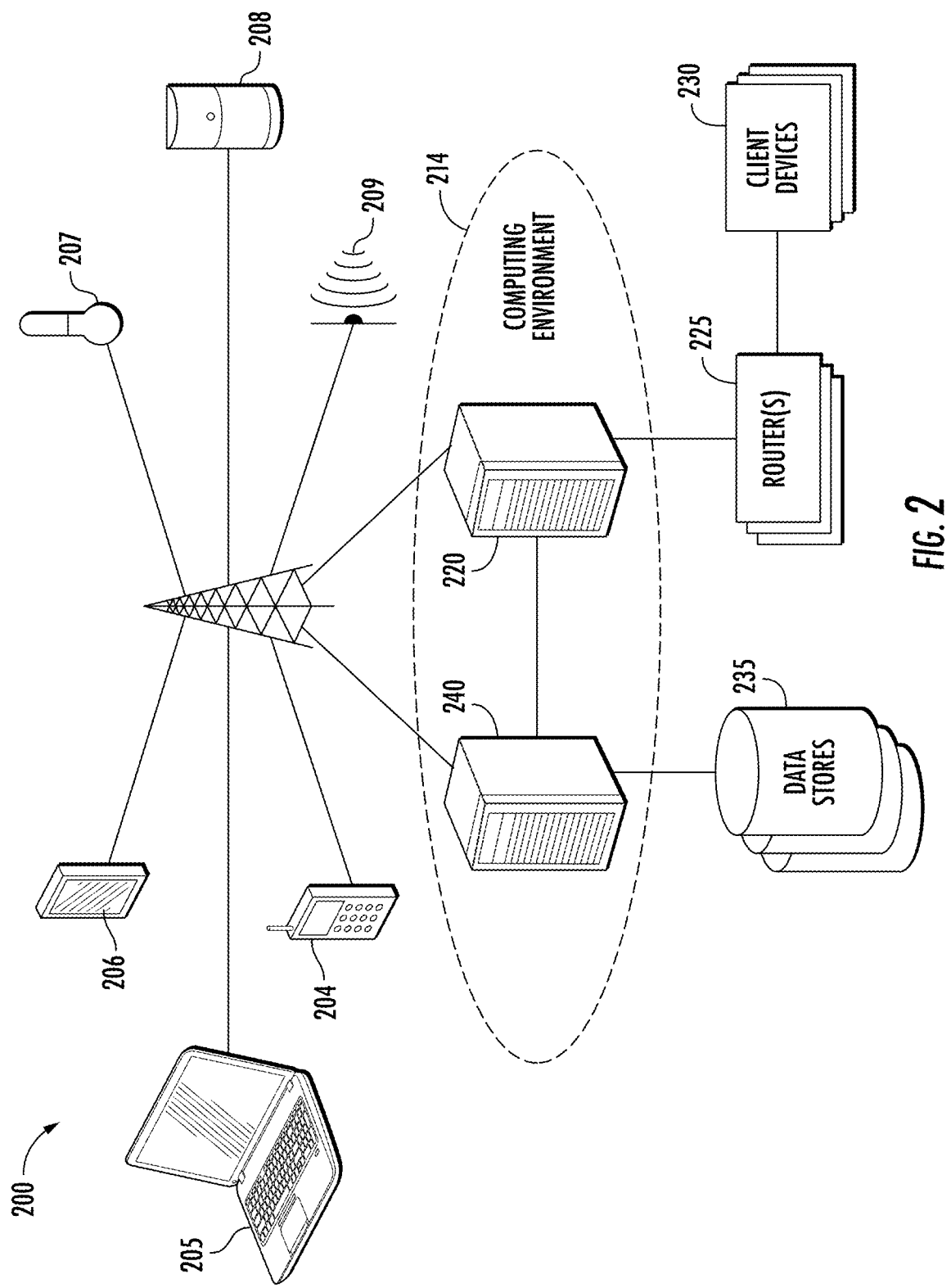
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

In some implementations, device(s) described with regards to FIG. 2 (e.g., sensors, devices that include sensors, devices that receive sensor data, etc.) can locally process or pre-process data prior to transmission. For example, the device(s) may apply filtering techniques to the data to detect outlier observations or values, such as the improved Hampel filter process described herein (e.g., with regards to FIGS. 14-21).

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
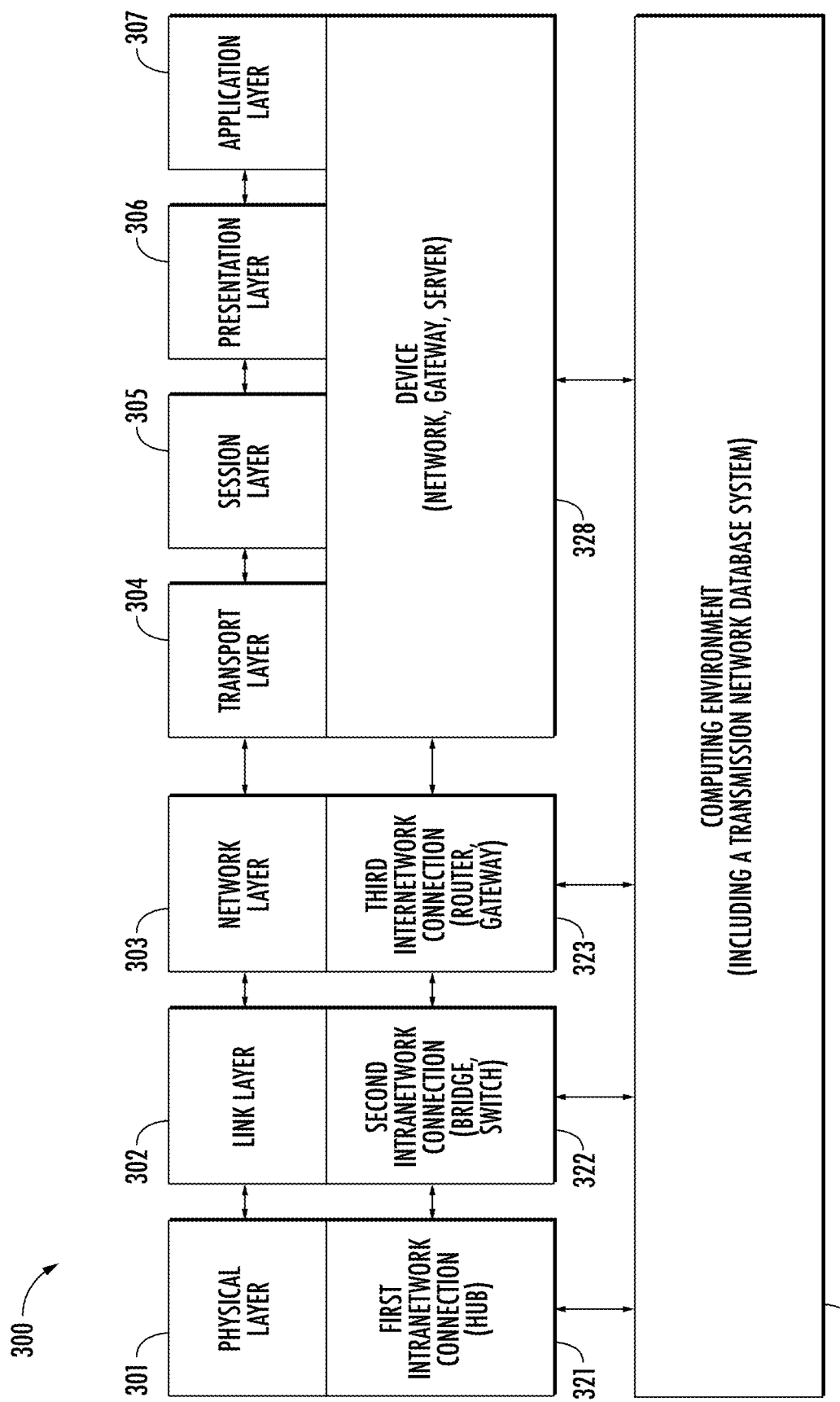
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bytes of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid. In some implementations, a node can locally process or pre-process a portion of data distributed to the node. For example, the node can perform a filtering operation, such as the improved Hampel filter process described herein (e.g., with regards to FIGS. 14-21), to detect outliers in the portion of the data.

Figure 4:
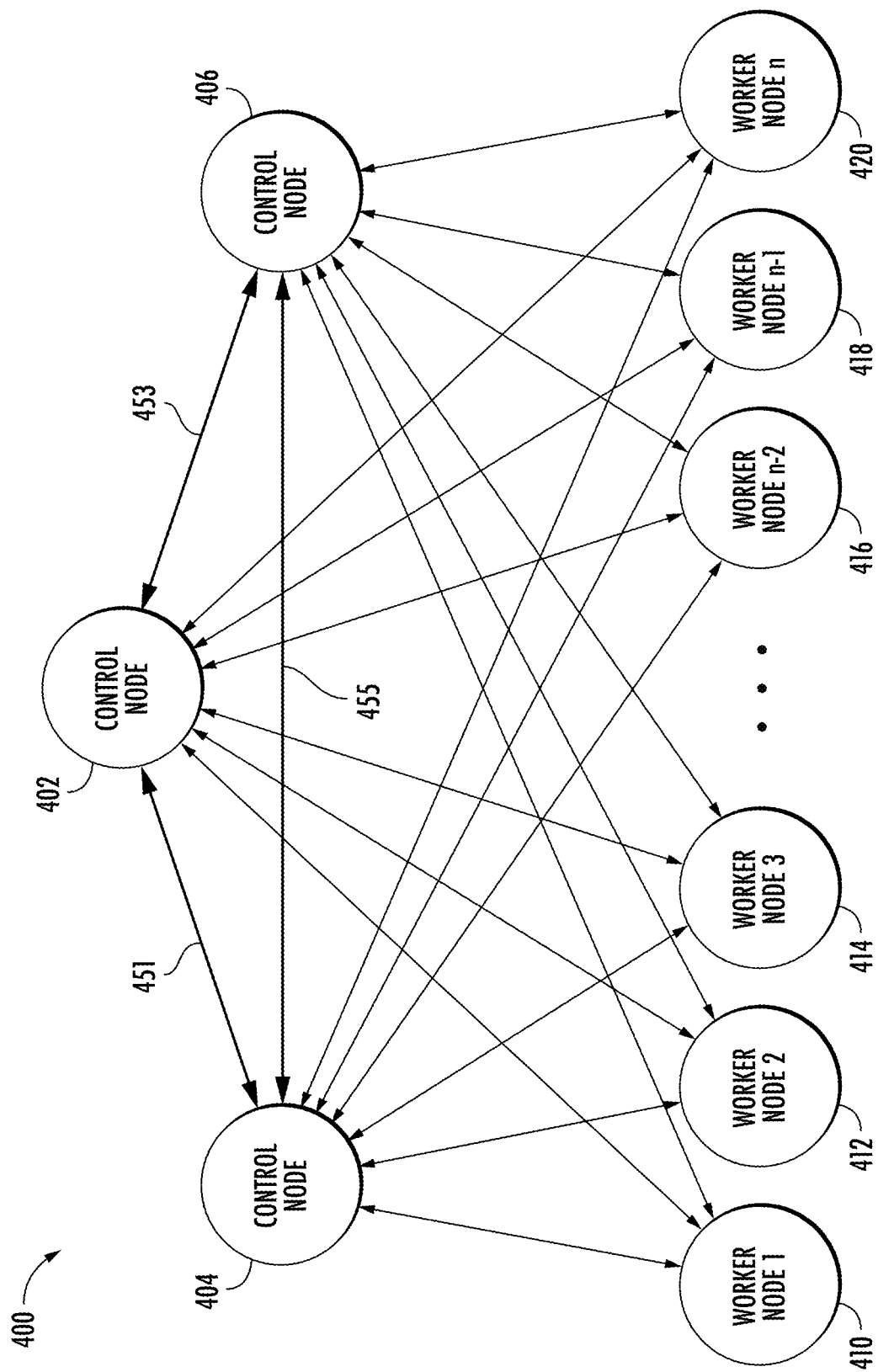
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
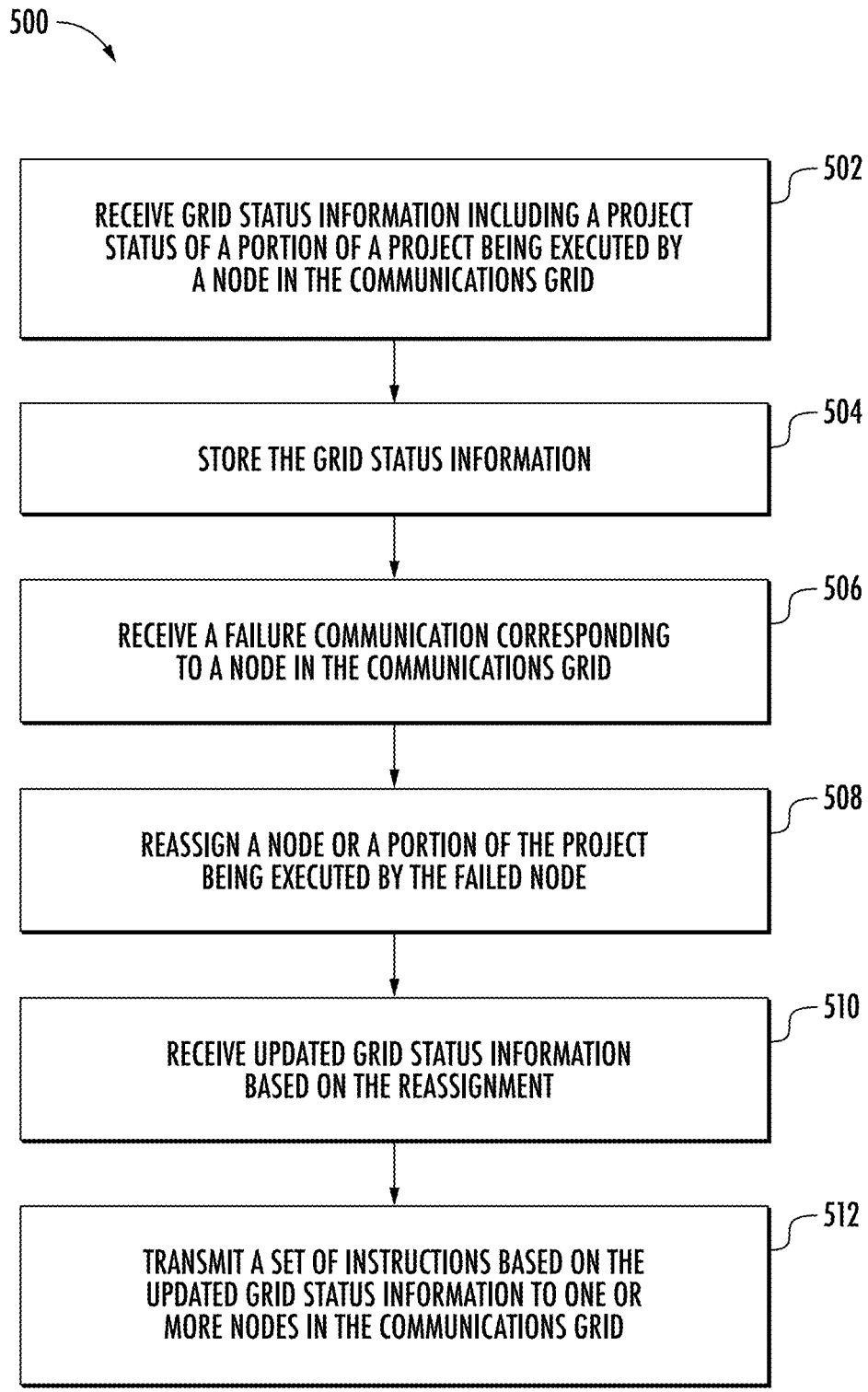
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
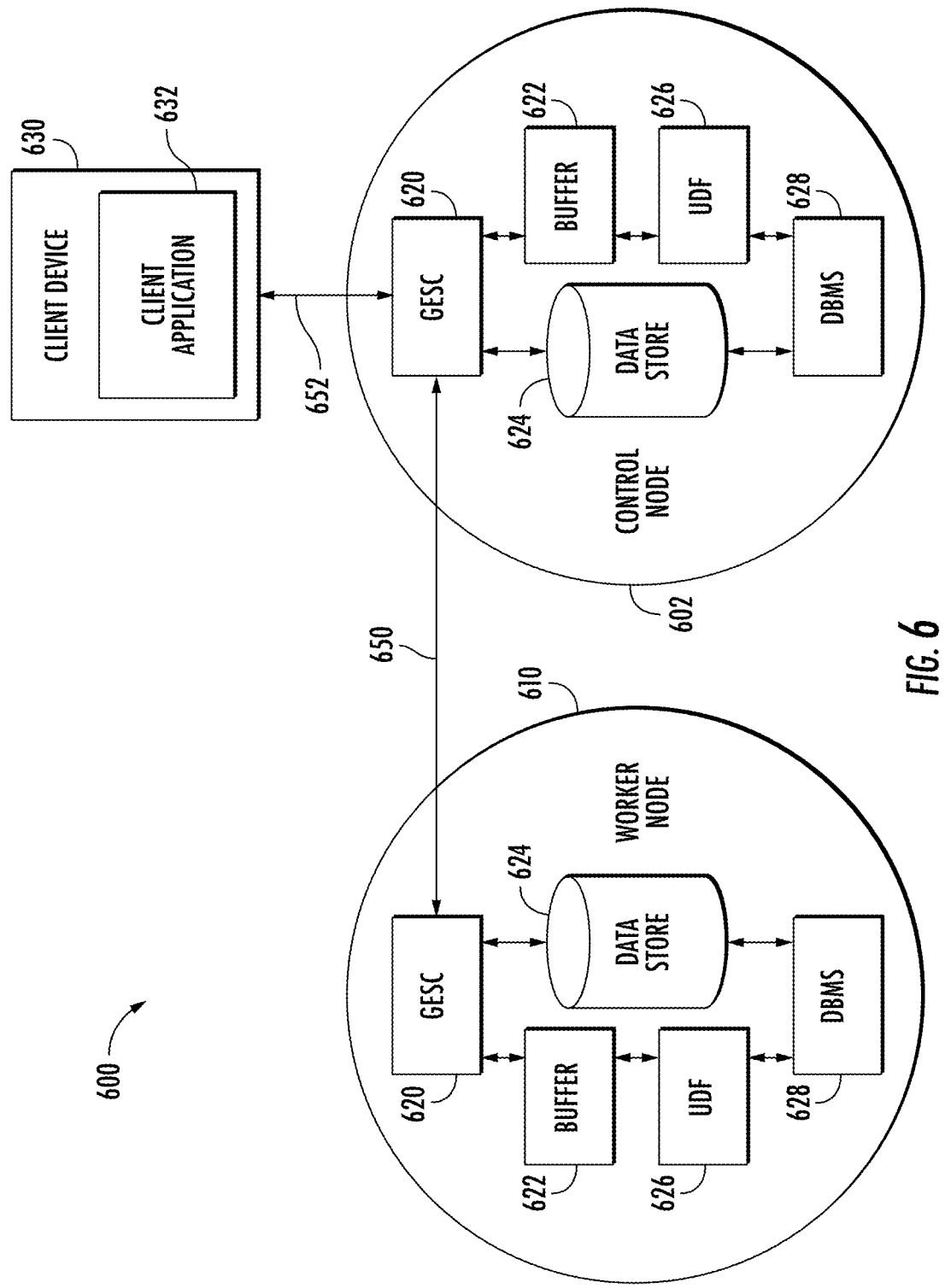
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
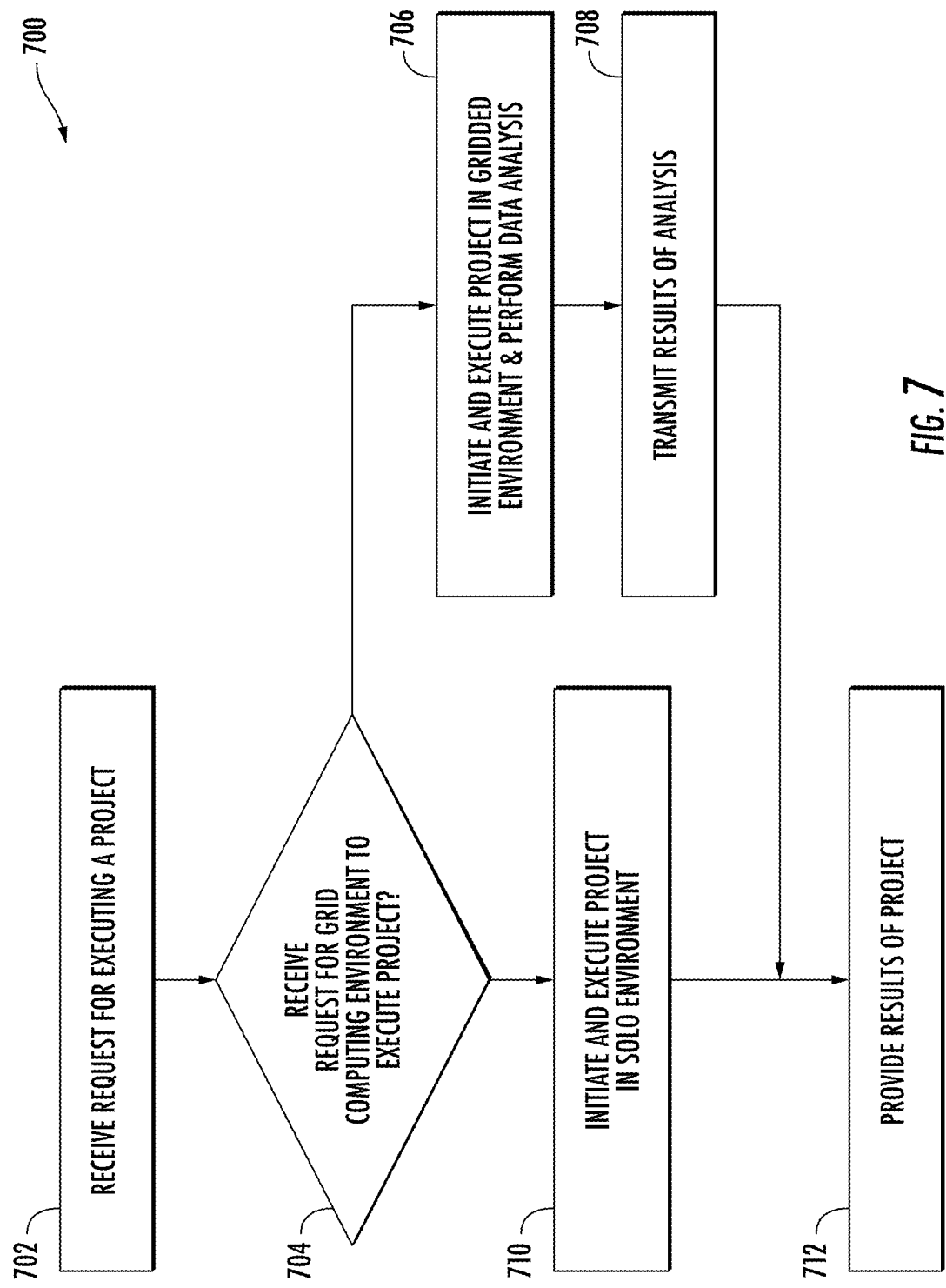
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704. For example, the instructions may instruct the grid-based computing environment to utilize the improved Hampel filter process described herein (e.g., with regards to FIGS. 14-21).

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

In some implementations, the ESPE can apply a data filtering technique to event streams. In instances where outlier detection for event streams is required, the ESPE can apply the Hampel filter process described herein (e.g., with regards to FIGS. 14-21).

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing devices of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or affected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
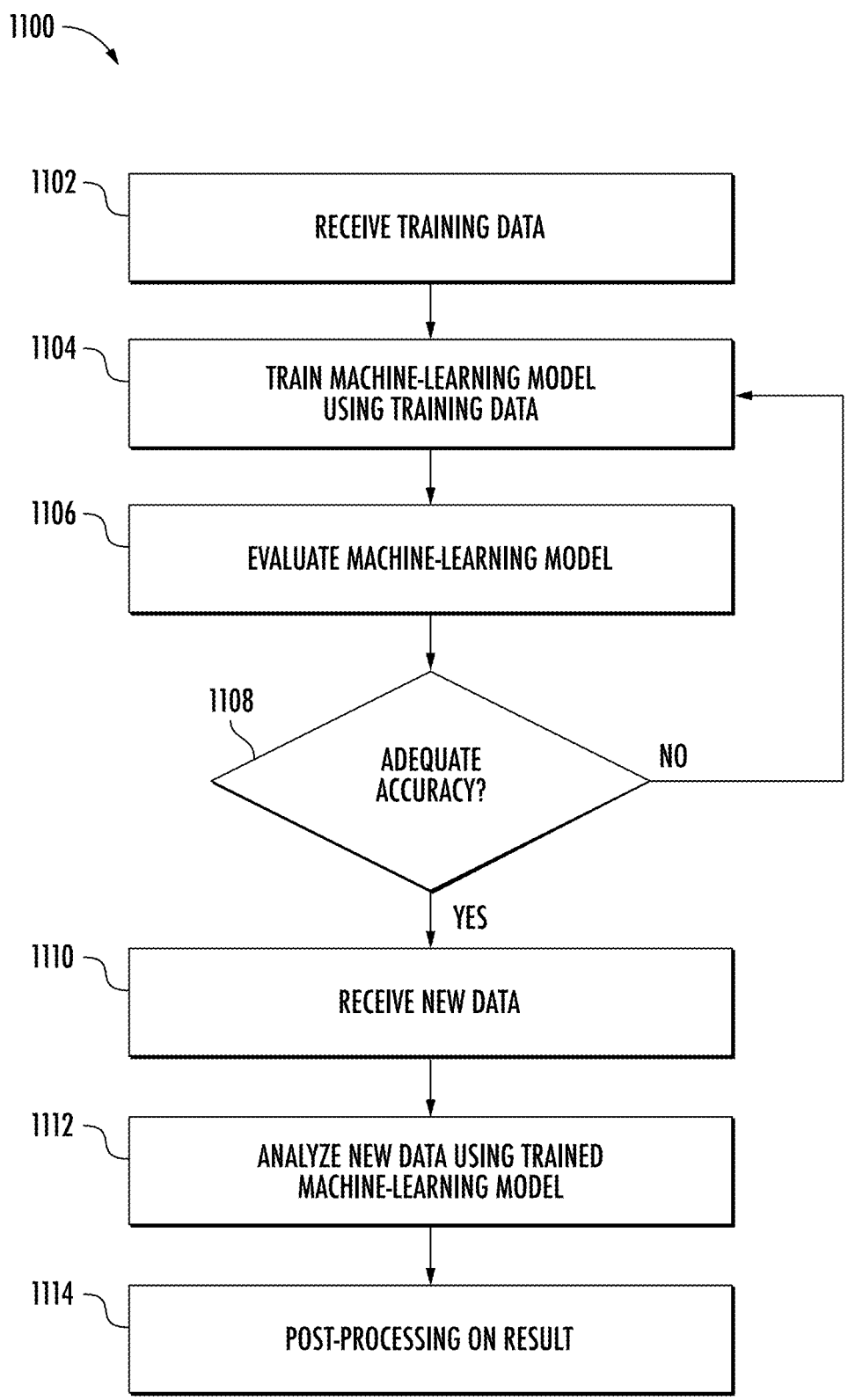
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In some implementations, prior to or subsequent to receipt of the training data, the training data can be processed to remove outlier training data elements. For example, the training data can be processed using the improved Hampel filter process described herein (e.g., with regards to FIGS. 14-21).

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
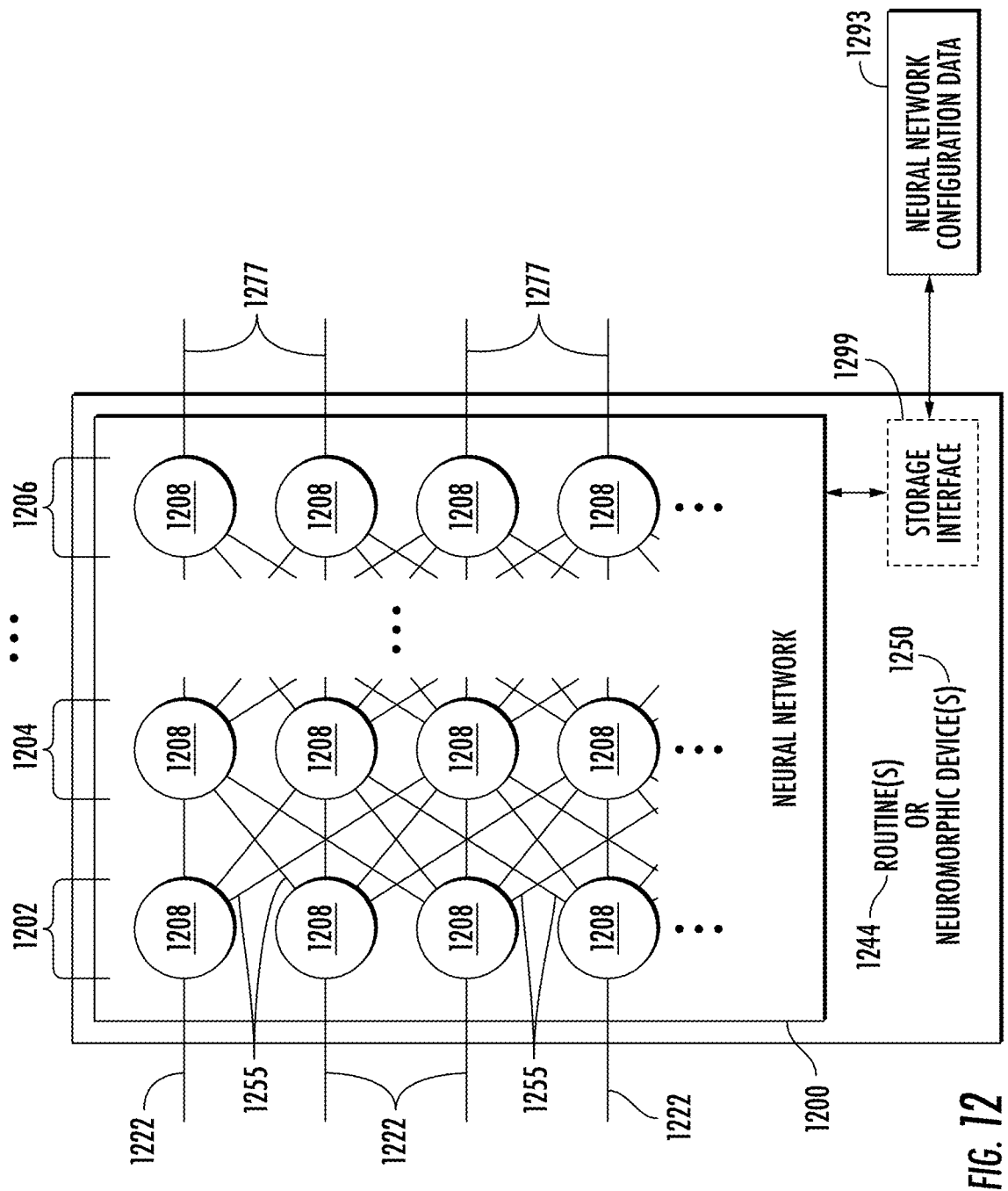
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max(x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
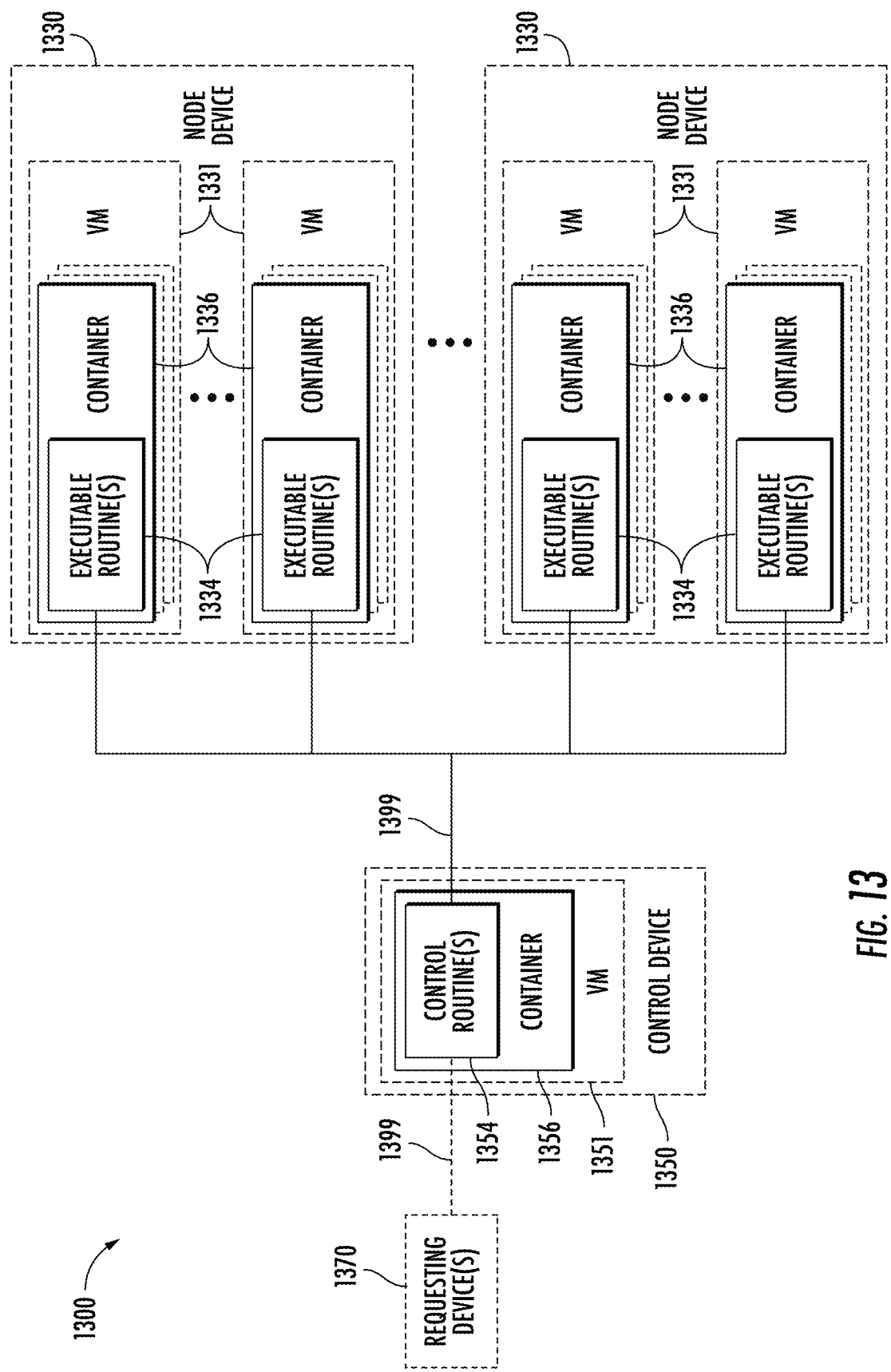
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336. For example, the operations or routines described with regards to the improved Hampel filter process described herein (e.g., with regards to FIGS. 14-21) can be executed within a single container or distributed for execution across a plurality of containers.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that affects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Figure 14:
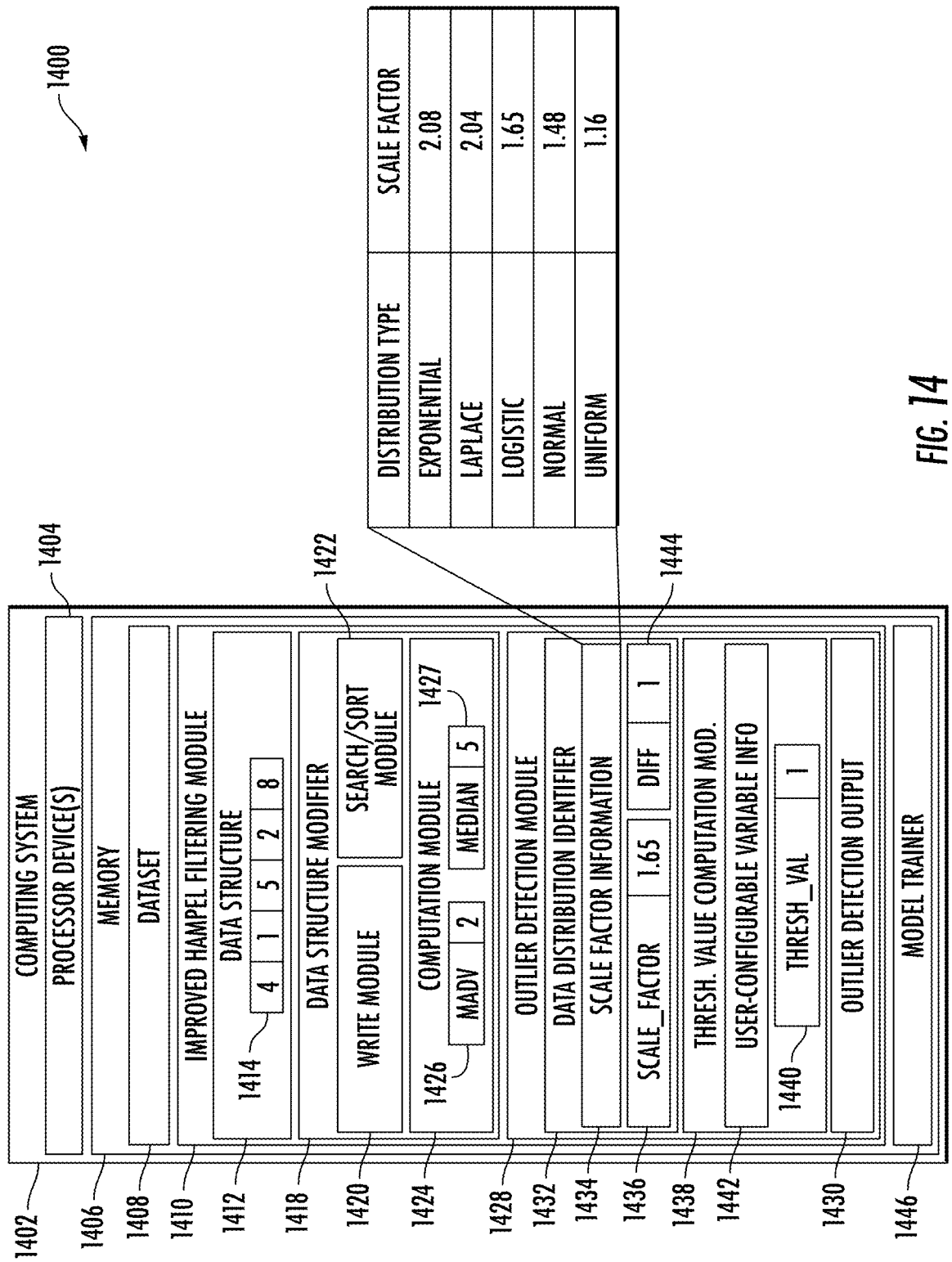
FIG. 14 is a block diagram of an example computing environment suitable for improved Hampel filtering, according to some embodiments of the present technology.

FIG. 14 is a block diagram of a computing environment 1400 suitable for improved Hampel filtering according to some implementations of the present disclosure. A computing environment 1400 can include a computing system 1402 with one or more processor device(s) 1404 and a memory 1406. As described herein, the "computing environment" 1400 can be any type or manner of computing environment (e.g., a collection of computing devices, systems, and related infrastructure associated with a particular entity or organization) in which data is processed or filtered.

In some implementations, the computing system 1402 may be a computing system that includes multiple computing devices. Alternatively, in some implementations, the computing system 1402 may be one or more computing devices within a computing system that includes multiple computing devices. Similarly, the processor device(s) 1404 may include any computing or electronic device capable of executing software instructions to implement the functionality described herein.

The memory 1406 can be or otherwise include any device(s) capable of storing data, including, but not limited to, volatile memory (random access memory, etc.), non-volatile memory, storage device(s) (e.g., hard drive(s), solid state drive(s), etc.). In some implementations, the memory 1406 can include a containerized unit of software instructions (i.e., a "packaged container"). The containerized unit of software instructions can collectively form a container that has been packaged using any type or manner of containerization technique.

A containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

In some implementations, the computing environment 1400 can include multiple types of nodes. As described herein, a "node" generally refers to a discrete unit of hardware and/or software resources. In some instances, nodes within the computing environment 1400 can be configured to perform specific tasks. For example, some nodes within the confidential computing environment 1400 can be configured as "compute" or "processing" nodes that handle processing tasks or provide processing-heavy services. Compute nodes are generally allocated with hardware devices that can facilitate processing tasks, such as Graphics Processing Units (GPUs), Central Processing Units (CPUs), Application-specific Integrated Circuits (ASICs), Field-Programmable Gate Arrays (FPGAs), etc.

Conversely, storage nodes can be allocated with hardware devices to facilitate storage tasks, such as storage devices (e.g., hard drives, etc.), memory, high-bandwidth network devices, physical storage media, etc.). It should be noted that in some instances, storage nodes can include processing devices (e.g., CPUs, etc.) to facilitate storage operations (e.g., read/write operations) and processing nodes can include storage devices (e.g., random access memory) to facilitate processing operations.

The memory 1406 of the computing system 1402 can include a dataset 1408. The dataset 1408 can be or otherwise include any type or manner of data, such as functional data (e.g., time-series data, etc.), sensor data, etc. In some implementations, the dataset 1408 can be, or include, data streaming in real-time from one or more data sources (e.g., SDVs reporting a current location, IoT sensor readings, etc.). In some implementations, the dataset 1408 can include sparse data The memory 1406 can include an improved Hampel filtering module 1410. The Hampel filtering module 1410 can perform the improved Hampel filtering process proposed above to substantially reduce computational resource expenditure and improve processing speed in comparison to conventional approaches.

The improved Hampel filtering module 1410 can include, or otherwise access, a data structure 1412. The data structure 1412 can be any type or manner of data structure that facilitates "sliding window" iterations through the values of the dataset 1408. For example, the data structure 1412 may be a one-dimensional array of values sampled from the dataset 1408. For another example, if each value of the dataset 1408 is labeled with a unique identifier the data structure 1412 can be a two-dimensional array that includes values sampled from the dataset 1408 and the unique identifiers corresponding to those values. For yet another example, if each value of the dataset 1408 is a multidimensional data element, the data structure 1412 can be a multidimensional data structure that stores each multidimensional data element.

The improved Hampel filtering module 1410 can sample values 1414 from the dataset 1408 for inclusion in the data structure 1412. More specifically, the improved Hampel filtering module can write the sampled values to the data structure 1412. For example, assume that the dataset includes the values [4, 1, 5, 2, 8, 7, 3]. The computing system can sequentially sample five values [4, 1, 5, 2, 8] from the dataset 1408. The improved Hampel filtering module 1410 can sort the values 1414 (e.g., with a Quicksort, Dual-heap sort, etc.) to obtain a set of sorted values. The computing system can then write the values 1414 as sorted to the data structure 1412. Alternatively, in some implementations, the computing system 1402 can write the values 1414 to the data structure 1412 prior to sorting and then sort the values within the data structure 1412.

As described herein, a "sliding window" generally refers to a technique used to process sequential data within a computing system, such as data stored in arrays (e.g., lists, sequences, etc.) or other sequential data structures. The sliding window technique involves maintaining a subset of elements or values (e.g., the values 1414 included in the data structure 1412) referred to as a "window." The "window" moves incrementally over the dataset 1408. As the window slides forward, values may enter or exit the window incrementally (e.g., adding a new element, removing an old element, etc.), allowing algorithms to update computations efficiently without recalculating the entire subset each time.

It should be noted that the improved Hampel filtering module 1410 can perform conventional Hampel filtering processes in addition to the improved Hampel filtering process described herein. Specifically, in some instances, the improved Hampel filtering module 1410 can perform an initial iteration of a conventional Hampel filtering process, and in doing so, can establish an initial set of sorted values, which can be stored to the data structure 1412. This is because a single sorting operation is used to initially sort the unsorted values sampled from the dataset, and then the sorted order is maintained efficiently via binary search or other efficient insertion methods that maintain an existing sorted order of values, which will be described in greater detail with regards to FIG. 15.

The improved Hampel filtering module 1410 can include a data structure modifier 1418. The data structure modifier 1418 can modify the data structure 1412 to move values, replace values, write new values, adjust the location of values, etc. within the data structure 1412. For example, assume that the values 1414 are a set of sorted values written to the data structure 1412 from a prior iteration of the Hampel filtering process. Further assume that a new value from the dataset 1408 is to be added to the data structure 1412. The data structure modifier 1418 can modify the data structure 1412 by replacing an oldest value of the values 1414 with the new value sampled from the dataset 1408.

To do so, the data structure modifier 1418 can identify an oldest value of the values 1414. As described herein, an "oldest" value of the values 1414 can refer to a value that was first written to the data structure 1412 of the values 1414 currently written to the data structure. More specifically, the "oldest" value will precede the other values of the values 1414 within the dataset 1408 itself. As such, in some implementations, the "age" of the value is dictated by its place in the dataset 1408 and not the data structure 1412. For example, assume that the dataset 1408 includes the values [4, 1, 5, 2, 8]. Further assume that the values [4, 1, 5, 2, 8] have been sorted and written to the data structure as [1, 2, 4, 5, 8]. In this instance, the oldest value can be identified as 4, as it precedes the other values within the dataset 1408. Because the position of the oldest value [4] is changed during sorting of the values, a binary search can be used to identify the position of the oldest value [4] in the sorted set.

The data structure modifier 1418 can include a write module 1420. The write module 1420 can write the new value from the dataset 1408 to the data structure 1412. The new value can replace the oldest value of the set of sorted values. The write module 1420 can write the new value such that the new value is inserted in a sorted position within the set of sorted values different than an original position of the oldest value.

In some implementations, to write the new value, the data structure modifier 1418 can include a search/sort module 1422. The data structure modifier 1418 can utilize the search/sort module 1422 to perform a search (e.g., a binary search) of the values 1414 to identify the oldest value of the values 1414. Additionally, or alternatively, in some implementations, the data structure modifier 1418 can utilize the search/sort module 1422 to perform a search or sort (e.g., an insertion sort, etc.) to identify the sorted location for the new value within the set of sorted values. The writing of the new value to replace the old value within the data structure 1412, and utilization of the search/sort module 1422, will be discussed in greater detail with regards to FIG. 15.

The data structure modifier 1418 can include the computation module 1424. The computation module 1424 can perform computations with the values 1414 to compute a Median Absolute Deviation (MAD) value 1426. The MAD value 1426 can be determined for the values 1414 once sorted. Specifically, once the values 1414 are sorted to form a set of sorted values, the computation module 1424 can identify a median value 1427 of the set of sorted values. The computation module 1424 can then modify the data structure 1412 (or the values written to the data structure 1412) by subtracting the identified median value from each value of the set of sorted values to obtain a corresponding set of signed deviation values. The computation module 1424 can then convert the sorted signed deviation values to absolute deviation values. Once converted, the computation module 1424 can compute the MAD value 1426 from the absolute deviation values.

For example, assume that the set of sorted values includes the values [1, 2, 5, 7, 8]. The computation module 1424 can identify a median value 1427 of [5]. The computation module can then obtain a set of sorted signed deviation values [−4, −3, 0, 2, 3] by subtracting the median value 1427 of [5] from each value of the set of sorted values [1, 2, 5, 7, 8]. The computation module 1424 can compute two subsets of sorted absolute deviation values [3, 4] and [0, 2, 3] by segmenting the set of sorted signed deviation values [−4, −3, 0, 2, 3] at a segmentation point (e.g., at a "transition" point between a non-negative number and a number) and removing signs from signed values. The computation module 1424 can then perform a binary search on the two subsets of sorted absolute deviation values [3, 4] and [0, 2, 3] to identify the MAD value 1426 of 2 in a computationally efficient manner. Operation of the computation module 1424 will be discussed in greater detail with regards to FIGS. 15 and 16.

The improved Hampel filtering module 1410 can include an outlier detection module 1428. The outlier detection module 1428 can detect whether a particular value from the dataset 1408 is an outlier. More specifically, the outlier detection module 1428 can generate an outlier decision output 1430. The outlier decision output 1430 can identify whether a particular value from the dataset 1408 being evaluated during a current iteration of the improved Hampel filtering process is an outlier. To do so, the outlier detection module 1428 can include a data distribution identifier 1432. The data distribution identifier 1432 can identify a type of data distribution associated with the dataset 1408. In other words, the data distribution identifier 1432 can compute which type of data distribution the dataset 1408 belongs to.

The data distribution identifier 1432 can include scale factor information 1434. The scale factor information 1434 can store pre-determined scale factors that correspond to certain data distribution types, such as non-Gaussian data distribution types. To follow the illustrated example, the scale factor information can store scale factors corresponding to exponential (e.g., 2.08 scale factor), Laplace (e.g., 2.04 scale factor), Logistic (e.g., 1.65 scale factor), Normal (e.g., 1.48 scale factor), uniform (e.g., 1.16 scale factor), etc. data distribution types. The outlier detection module 1428 can select a scale factor 1436 based on the identified scale data distribution type. For example, if the data distribution identifier 1432 identifies the dataset 1408 as a logistic data distribution, the outlier detection module 1428 can select a scale factor 1436 of 1.65.

The outlier detection module 1428 can include a threshold value computation module 1438. The threshold value computation module 1438 can compute a threshold value 1440 based at least in part on the MAD value 1426. Specifically, in some implementations, the threshold value computation module 1438 can compute the threshold value 1440 by multiplying the MAD value 1426 by the scale factor 1436 to obtain an estimated standard deviation for the values 1414 of the data structure 1412. The threshold value computation module 1438 can then multiply the standard deviation by a controllable variable. A controllable variable can be a user-configurable variable, dynamically adjusted variable, learned variable, etc.

For example, the threshold value computation module 1438 can obtain user-configurable variable information 1442 that specifies a user-configurable variable (e.g., a number of standard deviations). The threshold value computation module 1438 can multiply the standard deviation by the user-configurable variable to obtain the threshold value 1440. In other words, the threshold value computation module 1438 can multiply the MAD value 1426, the scale factor 1436, and the user-configurable variable to obtain the threshold value 1440.

Alternatively, in some implementations, the scale factor 1436 may be unknown if the data distribution identifier 1432 cannot accurately identify the data distribution type of the dataset 1408. In such instances, the threshold value computation module 1438 can compute the threshold value 1440 by multiplying the MAD value 1426 by the user-configurable variable. It should be understood that any type or manner of computationally efficient process for computing the threshold value 1440 from the MAD value 1426 can be utilized by the threshold value computation module 1438.

The outlier detection module 1428 can generate the outlier decision output 1430. To do so, the outlier detection module 1428 can first compute a difference 1444 between a particular value from the values 1414 (e.g., the value being evaluated for an outlier decision) and the median value 1427 of the set of sorted values. The value being evaluated can be one of the values included in the data structure 1412. For example, from the values 4, 1, 5, 2, 8, any value other than the oldest value being replaced (e.g., 4) can be the value being evaluated, as the oldest value is replaced prior to generation of the outlier decision output 1430. Generally, the particular value being evaluated is simply a value in the dataset 1408 immediately preceded by the last value being evaluated. For example, if the dataset includes the values [3, 5, 1, 4, 6], and the last value that was evaluated was [5], the next value to be evaluated can be [1]. Alternatively, the value being evaluated may be the new value written to the data structure. It should be noted that the placement of the value being evaluated within the data structure 1412 is not necessarily indicative of whether the value is being evaluated.

In some implementations, the outlier detection module 1428 can multiply the MAD value 1426 by the threshold value 1440. If the difference 1444 is greater than the MAD value 1426 multiplied by the threshold value 1440, the outlier detection module 1428 can generate an outlier decision output 1430 indicating that the particular value is an outlier. If the difference 1444 is less than or equal to the MAD value 1426 multiplied by the threshold value 1440, the outlier detection module 1428 can generate an outlier decision output 1430 indicating that the particular value is not an outlier. Operations of the outlier detection module 1428 will be discussed in greater detail with regards to FIG. 16.

In some implementations, the memory 1406 of the computing system 1402 can include a model trainer 1446. The model trainer 1446 can perform various operations to train, update, modify, etc. machine-learned models based on training data. To do so, the model trainer 1446 can store and modify training data to more effectively train various machine-learned models. For example, assume that the outlier decision output 1430 indicates that the value of [1] in the dataset 1408 is an outlier. In response, the model trainer 1446 can modify the dataset to remove the value [1] and then train a machine-learned model using the dataset 1408. In such fashion, implementations described herein enable more accurate and efficient training of machine-learned models, thus improving model performance while reducing training costs.

Figure 15:
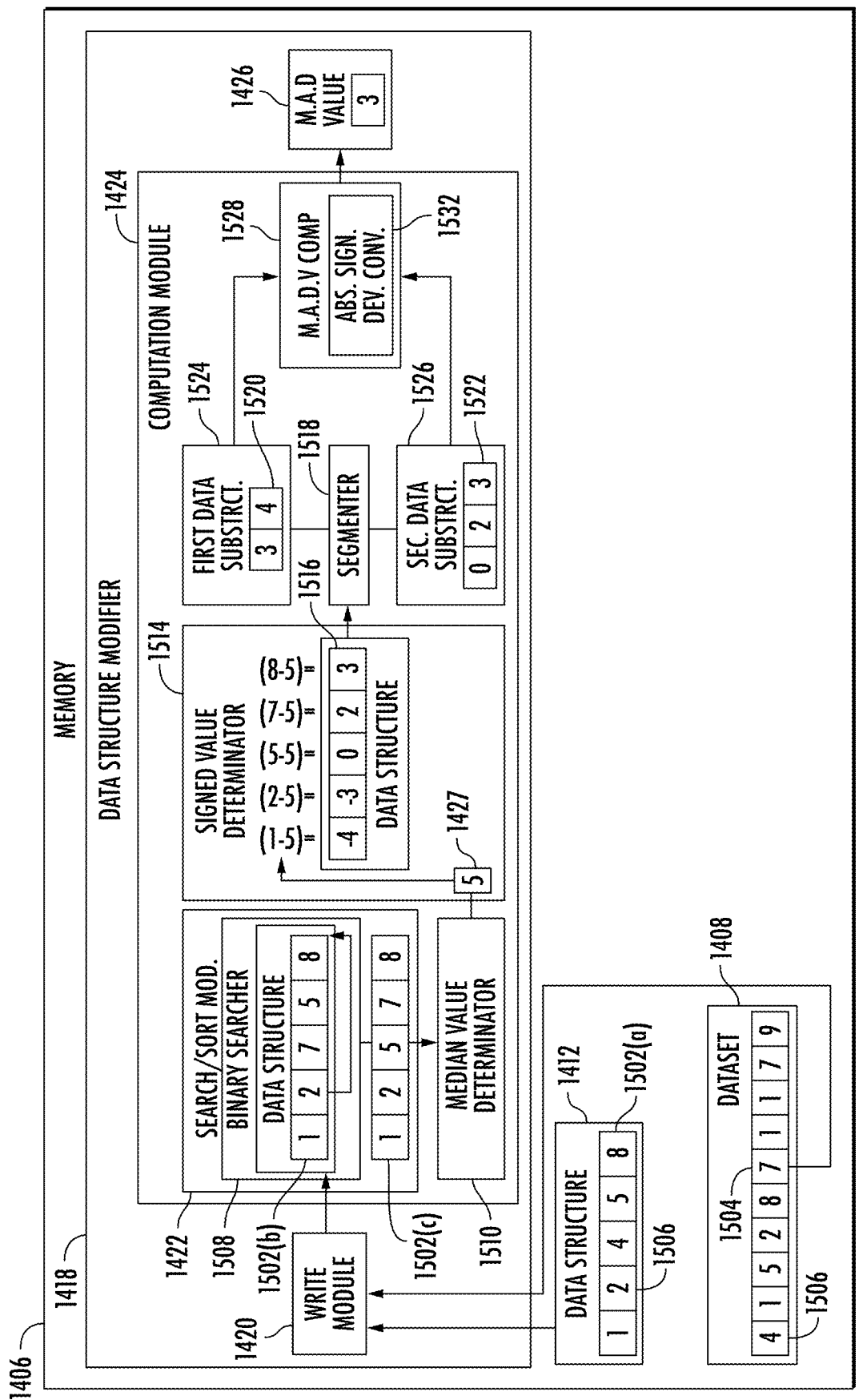
FIG. 15 is an overview data flow diagram for an example determining a Median Absolute deviation (MAD) value with the data structure modifier of FIG. 14, according to some embodiments of the present technology.

FIG. 15 is an overview data flow diagram for determining a Median Absolute deviation (MAD) value with the data structure modifier 1418 of FIG. 14, according to some embodiments of the present technology. FIG. 15 will be discussed in conjunction with FIG. 14. Specifically, the memory 1406 of the computing system 1402 can include the data structure modifier 1418. The data structure modifier 1418 can include the write module 1420, the search/sort module 1422, the computation module 1424, etc. of FIG. 14.

The data structure modifier 1418 can include, or access, the data structure 1412. The data structure 1412 can include a set of sorted values 1502 that includes the values [1, 2, 4, 5, 8]. It should be noted that the set of sorted values 1502 can include different values based on operations described with regards to FIG. 15. Operations may add and/or remove values from the set of sorted values 1502, while some other operations may modify an order of the set of sorted values 1502.

As such, to more clearly illustrate changes to the set of sorted values 1502, the set of sorted values 1502 is illustrated as different sets of sorted values 1502(*a*)-1502(*c*). Each of the sets of sorted values 1502(*a*)-1502(*c*) can include a different set of values and/or a different order of values with regards to a preceding or successive set of sorted values 1502(*a*)-1502(*c*). However, it should be noted that implementations described herein do not require, or necessarily utilize, multiple discrete sets of sorted values (although possible). Rather, the sets of sorted values 1502(*a*)-1502(*c*) are included to illustrate modifications made to the set of sorted values 1502.

For example, assume that the set of sorted values 1502 included in the data structure 1412 was sorted during a prior iteration of a conventional Hampel filtering process and/or the improved Hampel filtering process described herein. This set of values can be referred to as set of sorted values 1502(*a*). Further assume that the data structure modifier 1418 is illustrated performing a subsequent iteration of the improved Hampel filtering process in which an "oldest" value of the set of sorted values 1502 is replaced with a new value. When the "oldest" value is replaced, the composition of the set of sorted values can change so that the set is no longer in order. Although out-of-order, this set of values can be referred to as set of sorted values 1502(*b*). If the order of the set of sorted values 1502 are re-ordered to maintain sorted order, the newly sorted values can be referred to as set of sorted values 1502(*c*), etc.

The data structure modifier 1418 can sample a new value 1504 from the dataset 1408. As illustrated, the value "7" can be sampled from the dataset in sequence as it is next in the sequence of values included in the dataset 1408. For example, if the value "8" in the set of sorted values 1502 was the value added to the set of sorted values 1502 during the preceding iteration of the Hampel filtering process, the value "8" can be the value immediately preceding the value "7" in the dataset 1408 (as illustrated).

The write module 1420 of the data structure modifier 1418 can access the data structure 1412 to write the sampled value 1504 to the data structure 1412. Specifically, the write module 1420 of the data structure modifier 1418 can write the sampled value 1504 to the location of an "oldest" value 1506 in the set of sorted values 1502. In some implementations, the sampled value 1504 can be written to the location of the oldest value 1506 in the data structure 1412 to "overwrite" the oldest value 1506. Alternatively, in some implementations, the oldest value 1506 can be removed from the data structure 1412 and the new value 1504 can be added (i.e., written) to the data structure 1412.

As described herein, an "oldest" value refers to a value that was written to the data structure before any other values currently written to the data structure 1412. To follow the illustrated example, the dataset 1408 includes the values [1, 5, 1, 3, 2, 9, . . . ]. The values [1, 5, 1, 3, 2] have previously been iteratively and sequentially written to the data structure 1412 as the "sliding window" iterates over the dataset 1410 one value at a time. When the new value 1504 of "9" is sampled from the dataset 1408, the new value can be written to the location of the oldest value 1506, which is "1" (e.g., the value that has been written to the data structure 1412 for the longest period of time, etc.). It should be noted that the sliding window is a technique for handling data, and as such, is not explicitly illustrated as a discrete entity in FIG. 15.

The computation module 1424 can include, or access, the search/sort module 1422. The search/sort module 1422 can search for the oldest value 1506 within the data structure 1412 to replace with the new value 1504. For example, the search/sort module 1422 can include a binary searcher 1508. The binary searcher 1508 can perform a binary search to identify the oldest value 1506. The write module 1420 can write the new value 1504 to the location of the oldest value 1506 within the data structure 1412. Once the new value 1504 is written to the location of the old value 1504 in the data structure, the set of sorted values 1502 can be referred to as the set of sorted values 1502(*b*), rather than the set of sorted values 1502(*a*). To follow the illustrated example, the set of sorted values 1502(*a*) can be written to the data structure 1412 in order as [1, 2, 4, 5, 8]. The set of sorted values 1502(*b*) can be written to the data structure 1412 out-of-order as [1, 2, 7, 5, 8] upon replacement of the oldest value 1506 with the new value 1504.

The search/sort module 1422 can insert the new value 1504 into a sorted position within the data structure 1412 (i.e., within the set of sorted values 1502). To follow the illustrated example, the search/sort module 1422 can insert the new value 1504 after the value [5] in the set of sorted values 1502(*b*). Once inserted in the correct order, the set of sorted values 1502 can be referred to as 1502(*c*). By inserting the new value 1504 of 7 from the unsorted position of [1, 2, 7, 5, 8] in the set of sorted values 1502(*b*) to a sorted position of [1, 2, 5, 7, 8] in the set of sorted values 1502(*c*), the search/sort module 1422 can maintain sorted order. Furthermore, because only one value (e.g., the new value 1504) is out of order, the search/sort module 1422 can insert the new value 1504 in sorted order efficiently. For example, the search/sort module 1422 can perform a computationally efficient insertion sort operation to insert the new value 1504 in sorted order.

The computation module 1424 can include a median value determinator 1510. The median value determinator 1510 can determine the median value 1427 of the set of sorted values 1502(*c*). To follow the illustrated example, the median value determinator 1510 can identify the median value 1427 of the set of sorted values 1502(*c*) to be "5". The median value determinator 1510 can determine the median value 1427 using any type or manner of conventional median identifying process.

The computation module 1424 can include a signed value determinator 1514. The signed value determinator 1514 can determine a set of sorted signed deviation values 1516 based on the set of sorted values 1502(*c*). To do so, the signed value determinator 1514 can modify the data structure 1412 by subtracting the median value 1427 from each value of the set of sorted values 1502(*c*) to obtain a corresponding set of sorted signed deviation values 1516.

It should be noted that, as the set of sorted signed deviation values 1516 are signed, they maintain a correct sorted order when derived from the set of sorted values 1502(*c*). To follow the illustrated example, the signed value determinator can iteratively modify the data structure 1412 by subtracting the median value 1427 of [5] from the values [1, 2, 5, 7, 8] of the set of sorted values 1502(*c*) to obtain the set of sorted signed deviation values 1516 of [(1-5), (2-5), (5-5), (7-5), (8-5)] or [−4, −3, 0, 2, 3].

The computation module 1424 can include a segmenter 1518. The segmenter 1518 can segment the set of sorted signed deviation values 1516 to obtain a first subset of sorted absolute deviation values 1520 and a second subset of sorted absolute deviation values 1522. The first subset of sorted absolute deviation values 1520 can be stored to a first data substructure 1524 (e.g., an array, vector, etc.) and the second subset of sorted absolute deviation values 1522 can be stored to a second data substructure 1526. The segmentation of the set of sorted signed deviation values 1516 to obtain a first subset of sorted absolute deviation values 1520 and a second subset of sorted absolute deviation values 1522 will be discussed in greater detail with regards to FIG. 16.

The computation module 1424 can include a Median Absolute Deviation (MAD) value computation module 1528. The MAD value computation module 1528 can compute the MAD value 1426. To do so, the MAD value computation module 1528 can perform a binary search on the first data substructure 1524 and the second data substructure 1526 to identify the MAD value 1426. To do so, the MAD value computation module 1528 can include an absolute signed deviation converter 1532. The absolute signed deviation converter 1532 can convert the first subset of sorted absolute deviation values 1520 and a second subset of sorted absolute deviation values 1522 to their absolute deviation values to obtain a first subset of sorted absolute deviation values and a second subset of sorted absolute deviation values. Identification of the MAD value 1426, and determination of the sorted absolute deviation values, will be discussed in greater detail with regards to FIG. 16.

Figure 16:
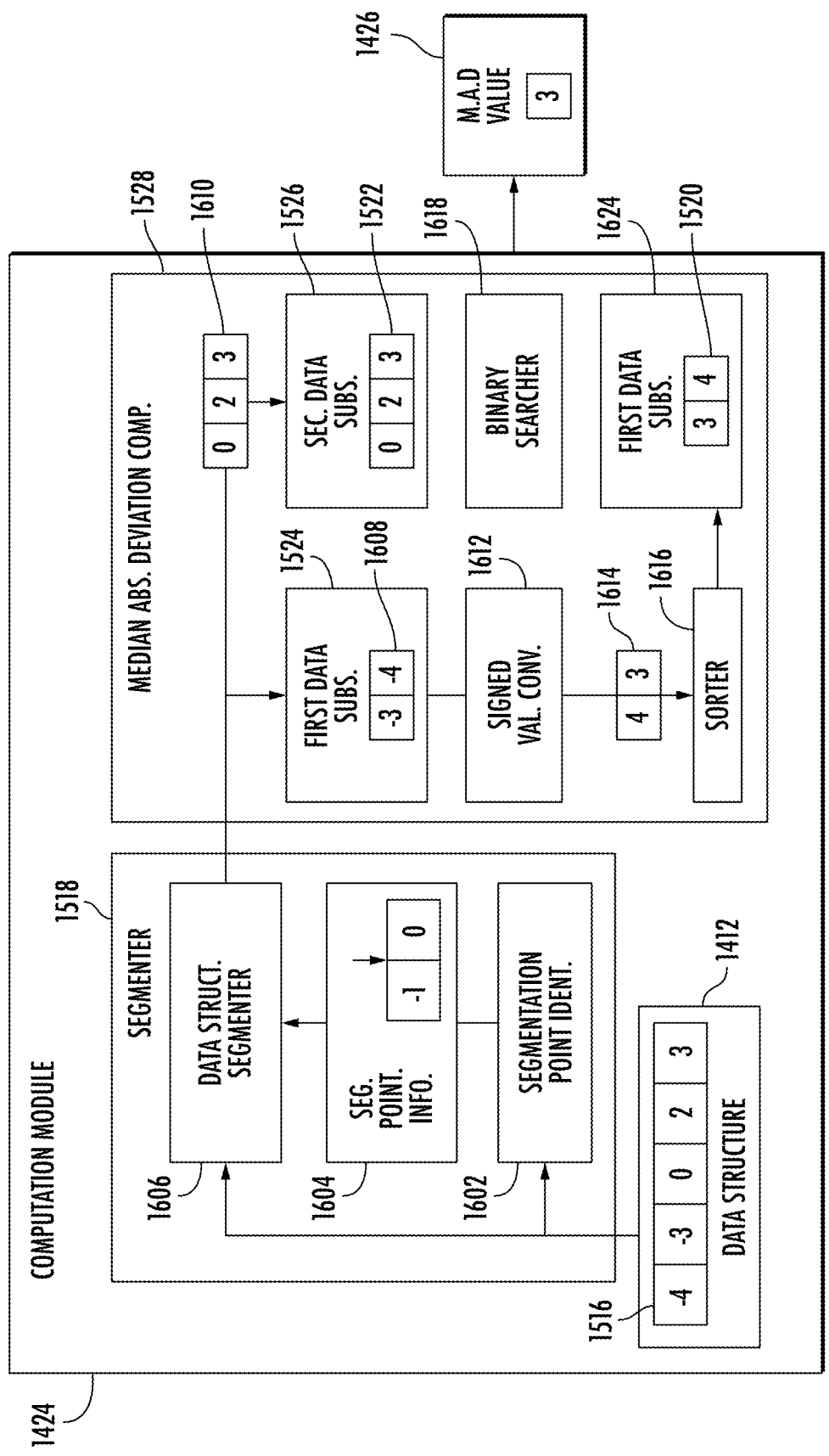
FIG. 16 is a data flow diagram for determining an example of the MAD value with the computation module of the data structure module of FIGS. 14 and 15, according to some embodiments of the present technology.

FIG. 16 is a data flow diagram for determining the MAD value with the computation module 1424 of the data structure module 1418 of FIGS. 14 and 15, according to some embodiments of the present technology. Specifically, the computation module 1424 can obtain, or otherwise access, the data structure 1412. The data structure 1412 can include the set of sorted signed deviation values 1516 as described with regards to FIG. 15. The computation module 1424 can include the segmenter 1518 described with regards to FIG. 15. The segmenter 1518 can include a segmentation point identifier 1602. The segmentation point identifier 1602 can generate segmentation point information 1604 that identifies a segmentation point in the set of sorted signed deviation values 1516. The segmentation point can be a point between a negative signed value and a non-negative value. For example, for the values of [−2, −1, 0, 2, 6], the segmentation point can be identified between the values of −1 and 0.

The segmenter 1518 can segment the set of sorted signed deviation values 1516 at the segmentation point identified by the segmentation point information 1604 to obtain a first subset of sorted signed deviation values 1608 and a second subset of sorted signed deviation values 1610. The first subset of sorted signed deviation values 1608 can be stored to the first data substructure 1524 of FIG. 5, and the second subset of sorted signed deviation values 1608 can be stored to the second data substructure 1526 of FIG. 5.

Additionally, or alternatively, in some implementations, the segmenter 1518 can include a data structure segmenter 1606. The data structure segmenter 1606 can segment the data structure 1412 itself at the segmentation point into the first data substructure 1524 and the second data substructure 1526. Doing so can also segment the set of sorted signed deviation values 1516 into the first subset of sorted signed deviation values 1608 and the second subset of sorted signed deviation values 1610, which can be stored to the first data substructure 1524 and the second data substructure 1526, respectively. Alternatively, in some implementations, the segmenter 1518 can segment the set of sorted signed deviation values 1516, and then write the segmented values to data substructures separate from the data structure 1412.

The computation module 1424 can include the MAD value computation module 1528 of FIG. 15. The MAD value computation module 1528 can compute the MAD value 1426. To do so, the MAD value computation module 1528 can first modify the first data substructure 1524 to convert the signed values of the first subset of sorted signed deviation values 1608 to the first subset of sorted absolute deviation values 1520.

Because the first subset of sorted signed deviation values 1608 is segmented at the segmentation point between the negative signed value and the non-negative value, the first subset of sorted signed deviation values 1608 only includes negative values. Further, these negative values retain their sorted order, as they were calculated by subtracting the median value 1427 from the set of sorted values 1502(c). As such, to convert the first subset of sorted signed deviation values 1608 to the first subset of sorted absolute deviation values 1520, the MAD value computation module 1528 can first remove the signs from the first subset of sorted absolute deviation values 1520 or otherwise convert the signed values to their absolute value equivalents.

When the signs are removed from the first subset of sorted signed deviation values 1608, the resulting absolute values retain a sorted order opposite to the order of the first subset of sorted signed deviation values 1608. For example, if the first subset of sorted signed deviation values 1608 included [−4, −3, −2, −1] in order from least to greatest, their absolute value equivalents of [4, 3, 2, 1] would be ordered from greatest to least. As such, the correct sorted order is retained and can be utilized to sort the absolute value equivalents and obtain the first subset of sorted absolute deviation values 1520.

To follow the illustrated example, the MAD value computation module 1528 can include a signed value converter 1612. The signed value converter 1612 can convert the first subset of sorted signed deviation values 1608 of [−3, −4] into a first subset of absolute values 1614 of [4. 3], which can be reversed to obtain the subset set of sorted absolute values. The signed value converter 1612 can convert the signed values to their absolute value equivalents using any type conversion technique or process, such as an absolute value function of a programming language (e.g., abs ( ) from standard C or C++ libraries, Math.abs( ) in Java-based languages, bit manipulation for systems with two-complement representation, etc.).

The MAD value computation module 1528 can include a sorter 1616. The sorter 1616 can sort the first subset of absolute values 1614 to obtain the first subset of sorted absolute deviation values 1520. To do so, the sorter 1616 can re-order the first subset of absolute values 1614 from "greatest-to-least" to "least-to-greatest." The sorter 1616 can do so using any type of conventional sorting process, and/or sorting processes that leverage the existing order maintained by the first subset of absolute values 1614 as described previously, such as such a reversal function of a programming language (e.g., std::reverse from the Standard Template Library (STD) for C++ libraries, collections.reverse( ) in Java-based languages, etc.).

Like the first subset of sorted signed deviation values 1608, the first subset of sorted signed deviation values 1610 was segmented at the segmentation point between the negative signed value and the non-negative value. Unlike the first subset of sorted signed deviation values 1608, which only includes negative values, the second subset of sorted signed deviation values 1608 only includes non-negative values, which are not signed. As the values are not signed, there is no need for the MAD value computation module 1528 to "convert" the second subset of sorted signed deviation values 1608 to the second subset of sorted absolute deviation values 1522, as the second subset of sorted signed deviation values 1608 is necessarily equal to the second subset of sorted absolute deviation values 1522. Further, since the second subset of sorted signed deviation values 1608 retains the sorted order determined for the set of sorted values 1502(c), the MAD value computation module 1528 has no need to sort the second subset of sorted signed deviation values 1608. In this manner, implementations described herein can further reduce the computational complexity of the Hampel filtering process.

The MAD value computation module 1528 can include a binary searcher 1618. The binary searcher 1618 can perform a binary search on the first subset of sorted absolute deviation values 1520 and the second subset of sorted absolute deviation values 1522 to identify the MAD value 1426. More specifically, once the sorted absolute deviation values are split, the first subset of sorted absolute deviation values 1520 can include a number of values less than or equal to the number of values of the second subset of sorted absolute deviation values 1522. As such, the median of the two subsets can be found at the "border" of the two sets.

Figure 21:
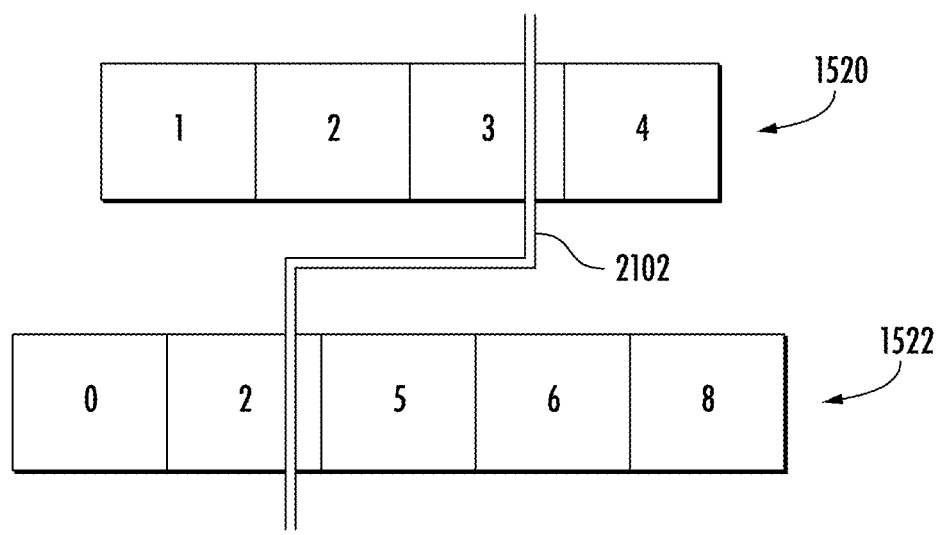
FIG. 21 is an illustrated representation of performing an example binary search on a first subset of sorted absolute deviation values and a second subset of sorted absolute deviation values to identify a MAD value, according to some embodiments of the present technology.
Figure 14:
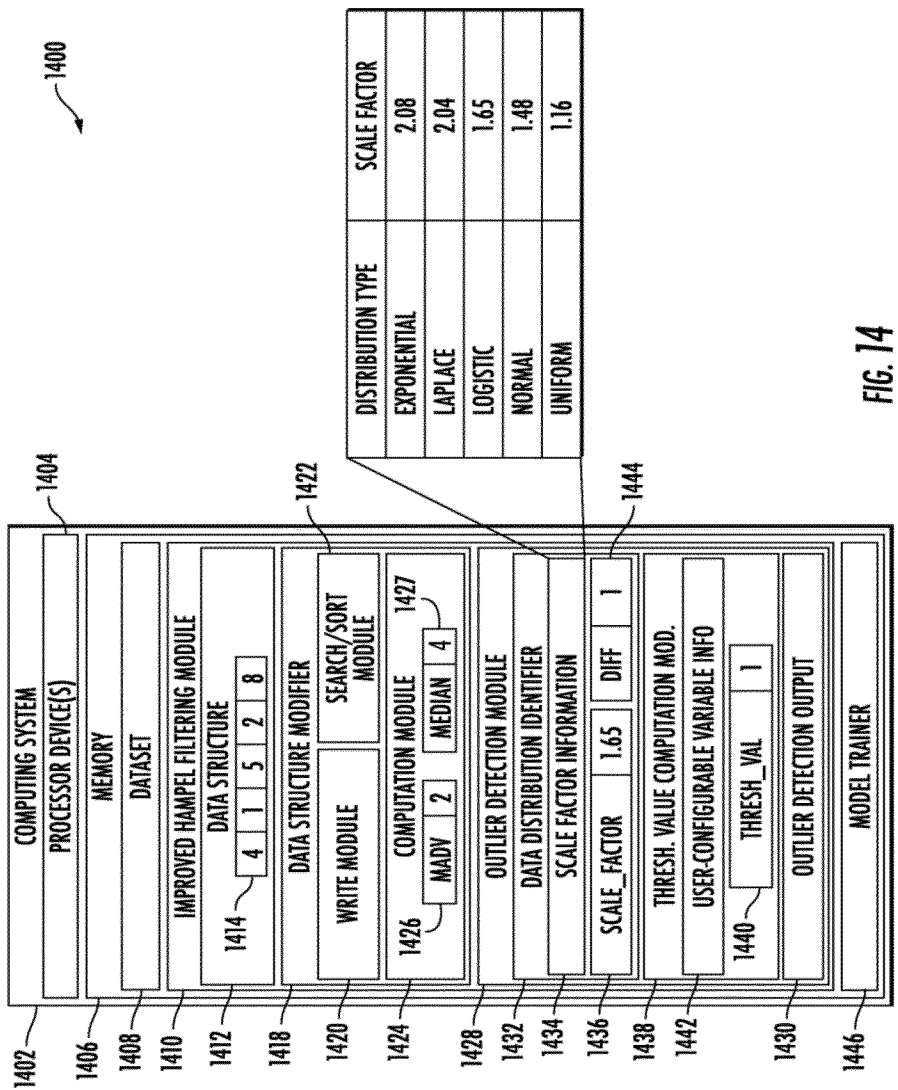

For a more specific example, turning to FIG. 21, FIG. 21 is an illustrated representation of performing a binary search on the first subset of sorted absolute deviation values 1520 and the second subset of sorted absolute deviation values 1522 to identify the MAD value 1426 according to some implementations of the present disclosure. More specifically, the first subset of sorted absolute deviation values 1520 includes the values [1, 2, 3, 4] and the second subset of sorted absolute deviation values 1522 includes the values [0, 2, 5, 6, 8]. A "border" 2102 is illustrated as a double-line between the value [3] in the first subset of sorted absolute deviation values 1520 and the value [2] in the second subset of sorted absolute deviation values 1522.

As illustrated, the border 2102 separates the first subset of sorted absolute deviation values 1520 and the second subset of sorted absolute deviation values 1522 so that 5 values are to the left of the border 2102 (e.g., 0, 1, 2, 2, 3), which means that these 5 values are less equal to the samples to the right of the border 2102. As such, the median value should be the largest value of the left border.

For example, assume that the indexes start from 0 for the arrays (e.g., the data substructures 1524 and 1526) that store the first subset of sorted absolute deviation values 1520 (e.g., [1, 6]) and the second subset of sorted absolute deviation values 1522 (e.g., [0, 2, 4]). Further assume that the variables p and q are the indexes for the border 2102. The median value can be calculated as MAX (MAX ([1, 2, 3]), MAX ([0, 2]) or MAX(MAX(ARRAY_1[P−1]), MAX(ARRAY_2 [Q−1]).

The "border" 2102 can represent the border between two sorted sets formed by dividing a sorted set at the median value of the sorted set. When a sorted set is divided at the median value into two sorted sets, the median value will be placed at the border between the two sorted sets. If the indexes of the two data substructures holding the sorted sets (e.g., arrays, etc.) start from 0, p and q can represent the index of the border. To find the border variables p and q, the computing system can begin to perform the binary search on the "smaller" of the two data substructures that holds the fewest values of the two data substructures (in this instance the first subset of sorted absolute deviation values 1520). This is because $$p + q = \frac{(\text{length}_{array_1} + \text{length}_{array_2} + 1)}{2},$$

and as such, by finding p, q can be derived and the median value can be identified while limiting work to the data substructure holding the least values. In this manner, the computational complexity of the filter process can be further reduced.

More specifically, the computing system can perform the following operations:

- Initialization:
  - left = 0, right = $\text{length}_{array_1}$, $k = \frac{(\text{length}_{array_1} + \text{length}_{array_2} + 1)}{2}$
- While left < right:
  - $p = \frac{\text{left} + \text{right} + 1}{2}$
  - $q = k - p$
  - if $\text{array}_1[p - 1] > [\text{array}_2[q]]$:
    - right = $p - 1$
  - else
    - left = $p$
- $p = \text{left}, q = k - p$
- If $\text{length}_{array_1} + \text{length}_{array_2}$ is odd, median = MAX($\text{array}_1[p - 1]$, $\text{array}_2[q - 1]$).
- If $\text{length}_{array_1} + \text{length}_{array_2}$ is even,
  median = $\frac{1}{2}$ * MAX(($\text{array}_1[p - 1]$, $\text{array}_2[q - 1]$) + MIN($\text{array}_1[p]$, $\text{array}_2[q]$).

For a specific example, the below Table 2 provides a step-by-step example of the above process applied to the example first subset of sorted absolute deviation values [1, 2, 3, 4] and the second subset of sorted absolute deviation values [0, 2, 5, 6, 8].

P=LEFT=3, Q=K−P=2.

TABLE 2

| Step | Left | Right | p | q | Condition |
|------|------|-------|---|---|-----------|
| 1 | 0 | 4 | 2 | 3 | array$_1$[p − 1] < array$_2$[q] |
| 2 | 2 | 4 | 3 | 2 | array$_1$[p − 1] < array$_2$[q] |
| 3 | 3 | 4 | 4 | 1 | array$_1$[p − 1] > array$_2$[q] |
| 4 | 3 | 3 |   |   | STOP |

Figure 17A:
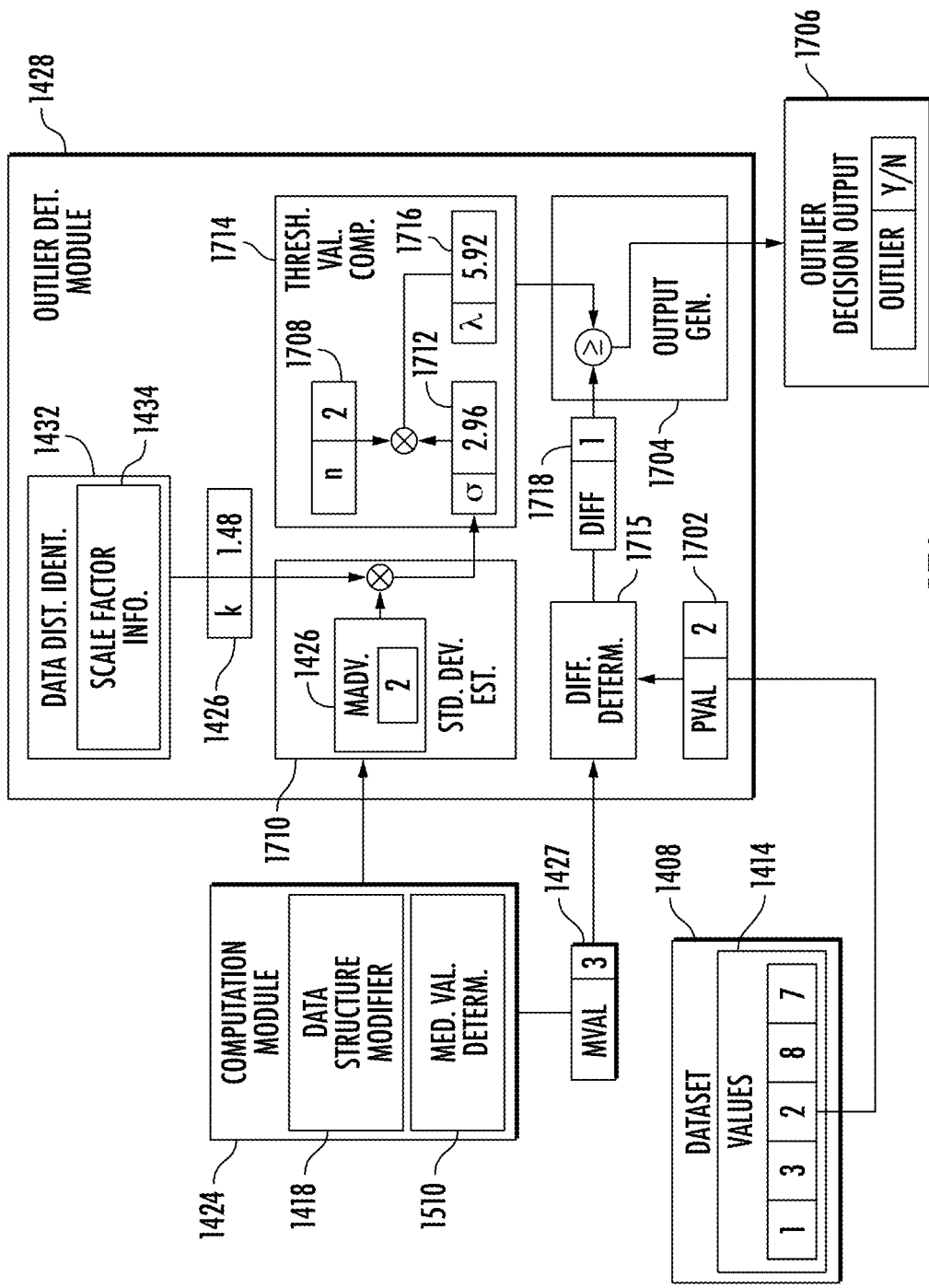
FIG. 17A is a data flow diagram for making an example outlier decision output with a known scale factor using the outlier detection module of FIGS. 14 and 15, according to some embodiments of the present technology.

Returning to FIG. 17A, FIG. 17A is a data flow diagram for making an outlier decision output 1706 with a known scale factor using the outlier detection module 1428 of FIGS. 14 and 15 according to some implementations of the present disclosure. FIG. 17A will be discussed in conjunction with FIGS. 14, 15, and 16. Specifically, the outlier detection module 1428 can obtain the median value 1427 from the median value determinator 1510 of the computation module 1424. The outlier detection module 1428 can also obtain the median value 1427 from the data structure modifier 1418 of the computation module 1424.

The outlier detection module 1428 can also obtain, or otherwise access, a particular value 1702 from the values 1414 included in the dataset 1408. As described with regards to FIG. 14, the outlier detection module 1428 can also obtain the median value 1427 from the data structure modifier 1418 of the computation module 1424. The particular value 1702 can be the value currently being evaluated for a particular iteration of the Hampel filtering process. To follow the illustrated example, if the particular value 1702 for this iteration of the Hampel filtering process is [2], the value that was evaluated in preceding iteration of the Hampel filtering process is [3], and the value to be evaluated in a successive iteration can be [8]. In this manner, the outlier detection module 1428 can iterate through each value in the dataset 1408 to generate an outlier decision for each value.

In some implementations, the particular value 1702 can be the "centered" value in the range of values sampled for the data structure 1412. Specifically, the "centered" value can refer to the centered value prior to the values being sorted. For example, if the sampled values (including the new value 1504 and excluding the oldest value 1506) are sampled sequentially from the dataset as [1, 3, 2, 8, 7], the centered value would be [2]. After sorting the values to obtain the set of sorted values [1, 2, 3, 8, 7], the centered value will remain 2. In some implementations, the data structure modifier 1418 can maintain a pointer or some other indication to track the value that is currently being evaluated from the dataset 1408.

The outlier detection module 1428 can include an outlier decision output generator 1704. The output decision output generator 1704 can generate an outlier decision output 1706. The outlier decision output 1706 can indicate whether the particular value 1702 is an outlier. To do so, the outlier detection module 1428 can obtain a controllable variable 1708 (e.g., a user-configurable variable, a dynamically adjusted variable, a static pre-configured variable, etc.). The controllable variable 1708 can be a variable that can be controlled to at least partially influence the outcome of the outlier decision output 1706. In some implementations, the controllable variable 1708 can be a user-configurable number of standard deviations (e.g., a number of standard deviations away from the local median a value must be to be considered an outlier). Alternatively, in some implementations, the controllable variable 1708 can be a value that is scaled or adjusted based on current results of the Hampel filtering process (e.g., to effectively increase or decrease the sensitivity of the outlier detection process).

The outlier detection module 1428 can include a standard deviation estimator 1710. The standard deviation estimator 1710 can estimate a standard deviation 1712 of the values 1414 included in the data structure 1412. To do so, the standard deviation estimator 1710 can obtain the scale factor 1436 from the data distribution identifier 1432 based on the scale factor information 1434. The standard deviation estimator 1710 can then estimate the standard deviation 1712 by multiplying the scale factor 1436 by the MAD value 1426 to obtain the standard deviation 1712. To follow the illustrated example, the standard deviation estimator 1710 can estimate a standard deviation of [2.96] by multiplying the scale factor of [1.48] by the MAD value of [2]. As such, it should generally be understood that the MAD value, in conjunction with an appropriately selected scale factor, can be utilized to accurately and efficiently estimate the standard deviation for the values within the sliding window.

The outlier detection module 1428 can include a threshold value computation module 1714. The threshold value computation module 1714 can compute a threshold value 1716. To do so, the threshold value computation module 1714 can multiply the standard deviation 1712 by the controllable variable 1708 to obtain the threshold value 1716. To follow the illustrated example, the threshold value computation module 1714 can multiply the standard deviation of [2.96] by the controllable variable of [2] to obtain the threshold value of [5.92].

The outlier detection module 1428 can include a difference determinator 1715. The difference determinator 1715 can determine a difference value 1718 comprising a difference between the median value 1427 and the particular value 1702. The difference determinator 1715 can calculate the difference value 1718 and provide the difference value 1718 to the output decision output generator 1704. To follow the illustrated example, the difference determinator 1715 can determine a difference of [1] between the median value of [3] and the particular value of [2].

The output decision output generator 1704 can generate the outlier decision output 1706 based on the difference value 1718 and the threshold value 1716. If the difference value 1718 is greater than or equal to the threshold value 1716, the outlier decision output 1706 can indicate that the particular value 1702 is an outlier. If the difference value 1718 is less than the threshold value 1716, the outlier decision output 1706 can indicate that the particular value 1702 is not an outlier.

Figure 17B:
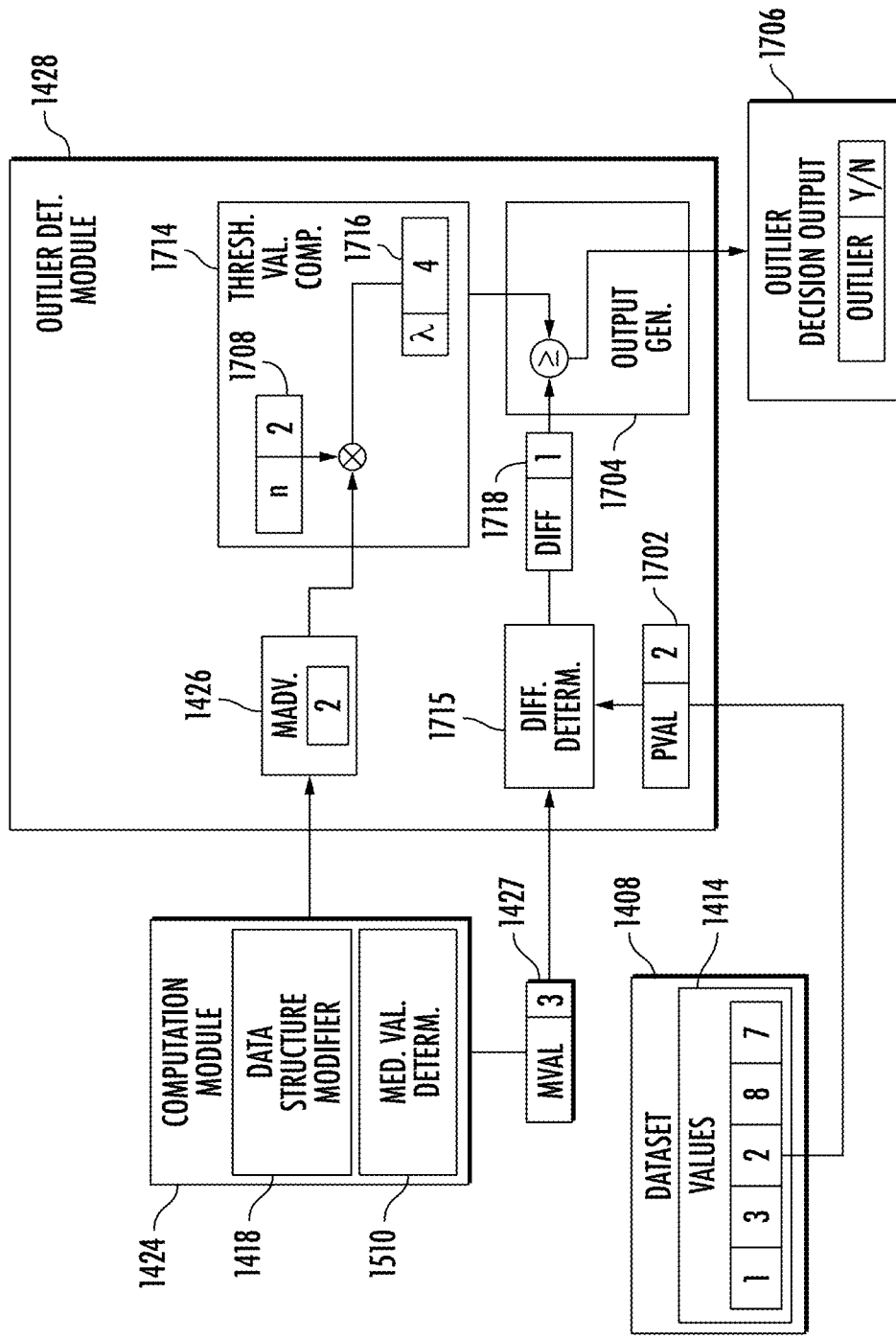
FIG. 17B is a data flow diagram for an example of making an outlier decision output without a known scale factor using the outlier detection module of FIGS. 14 and 15, according to some embodiments of the present technology.

FIG. 17B is a data flow diagram for making an outlier decision output 1706 without a known scale factor using the outlier detection module 1428 of FIGS. 14 and 15 according to some implementations of the present disclosure. FIG. 17B will be discussed in conjunction with FIGS. 14, 15, 16, and 17A. Specifically, the outlier detection module 1428 can obtain the median value 1427, the particular value 702, the MAD value 1426, the difference value 1718, and the controllable variable 1708 as described with regards to FIG. 7A. However, unlike FIG. 7A, the data distribution identifier 1432 can be unable to accurately identify the data distribution type of the dataset 1408, and as such, cannot select the particular scale factor 1436 from the scale factor information 1434.

In such instances, the threshold value computation module 1714 can compute the threshold value 1716 by multiplying the MAD value 1426 by the controllable variable 1708 to obtain the threshold value 1716. As described with regards to FIG. 17A, if the difference value 1718 is less than the threshold value 1716, the outlier decision output 1706 can indicate that the particular value 1702 is not an outlier.

Figure 18:
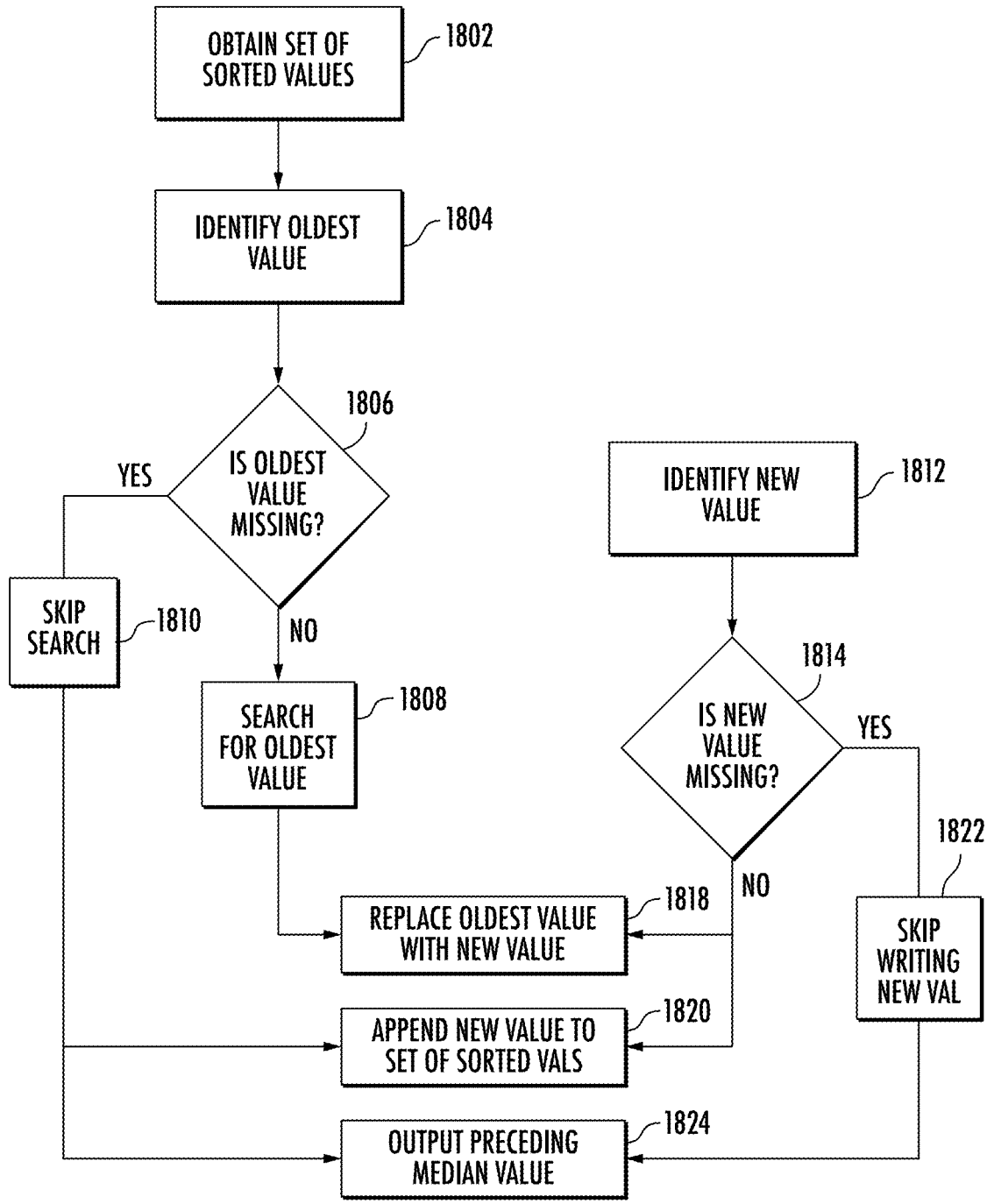
FIG. 18 is a flowchart diagram for an example method for handling missing values with the improved Hampel filtering process, according to some embodiments of the present technology.

FIG. 18 is a flowchart diagram for a method for handling missing values with the improved Hampel filtering process according to some implementations of the present disclosure. Although FIG. 18 depicts steps performed in a particular order for purposes of illustration and discussion, the methods of the present disclosure are not limited to the particularly illustrated order or arrangement. The various operations of the method 2000 can be omitted, rearranged, combined, and/or adapted in various ways without deviating from the scope of the present disclosure.

In particular, the method described below enables handling of missing or null values in a manner that preserves structural features (e.g., temporal accuracy, etc.) for time-series data or other functional data typically lost using conventional Hampel filtering techniques. Specifically, conventional approaches solution generally attempt to perform data preprocessing to replace null values with existing values (e.g., a min value, a max value, a neighboring value, etc.) or a derived value (e.g., an average value, a median value, etc.). Once preprocessing is complete, and the null value is replaced, such techniques will calculate the median on the preprocessed set. However, when such techniques are applied to functional data (e.g., time-series data), certain features of the functional data can be degraded. For example, given a dataset of time-series data, replacing a missing value with an average value must also estimate temporal information that cannot be accurately estimated in the same manner, thus degrading the accuracy of the time-series data.

At 1802, a computing system can obtain a set of sorted values. The set of sorted values can be obtained from a dataset. For example, if the dataset includes the values [1, 5, 9, 3, 6, 2, 5], values [1, 5, 9, 3, 6] may be sampled from the dataset and then sorted to obtain a sorted set of values [1, 3, 5, 6, 9].

At 1804, the computing system can identify an oldest value within the set of sorted values as described with regards to FIGS. 14-17B.

At 1806, the computing system can determine whether the oldest value is missing. For example, the computing system can determine that the expected location of the oldest value comprises a null value or the like, a corrupted value or data element, no value at all, etc.

If the oldest value is not missing, at 1808, the computing system can perform a search for the value. For example, the computing system can perform a binary search of a data structure that stores the values. Conversely, if the oldest value is not missing, at 1810, the computing system can skip performing the binary search for the oldest value.

At 1812, the computing system can identify a new value from a dataset (e.g., the dataset the oldest value was sampled from). More specifically, the computing system can increment a sliding window being used to evaluate the dataset. By incrementing the sliding window, the computing system can select the next value sequentially in the dataset. For example, assume the dataset includes the values [1, 3, 1, 5, 9, 6, NaN], with NaN being a null or missing value. Further assume that the data structure stores the values as a set of sorted values [1, 3, 5, 6, 9], with [1] being the oldest value sampled from the dataset and [6] being the last value sampled from the dataset. As such, when the data structure stores the values [1, 3, 5, 6, 9], the sliding window and the corresponding set of sorted values can be visualized as the following, with each value in a bolded box being included in the sliding window:

Sliding Window: [1, [3], [1], [5], [9], [6], NaN];
Set of sorted values: [1, 3, 5, 6, 9]

When the sliding window is incremented by one, the oldest value (e.g., 3) is removed and the newest value (e.g., NaN) is added, which can be visualized as the following:

[1, 3, [1], [5], [9], [6], [NaN]]
Set of sorted values: [1, 5, 6, 9]

In this manner, the computing system can identify a "missing" value as a new value.

At 1814, the computing system can determine whether the new value is missing.

At 1816, if the new value is determined to not be missing at 1814, and the oldest value is determined not to be missing at 1806, the computing system can write the new value to the data structure to replace the oldest value as described with regards to FIGS. 14-17B.

Alternatively, at 1818, if the new value is determined to not be missing at 1814, and the oldest value is determined to be missing at 1806, the computing system can add the new value to the data structure. For example, the computing system can instantiate a data structure (if necessary) and insert the new value at the end of the data structure and increase the length of the data structure (e.g., a vector, array, etc.) by 1. The computing system can insert the new value to the correct position to maintain sorted order.

Alternatively, at 1820, if the new value is determined to be missing at 1814, and the oldest value is determined not to be missing at 1806, the computing system can remove the oldest value from the data structure. The removed value separates the data structure into two data sub-structures (e.g., of two values each). The computing system can merge these two segments together and reduce the total length of the data structure by 1.

Alternatively, at 1822, if the new value is determined to be missing at 1814, and the oldest value is determined not to be missing at 1806, the computing system can skip writing the new value to the data structure. At 1824, the computing system can output the preceding (e.g., last) median value.

Figure 19A:
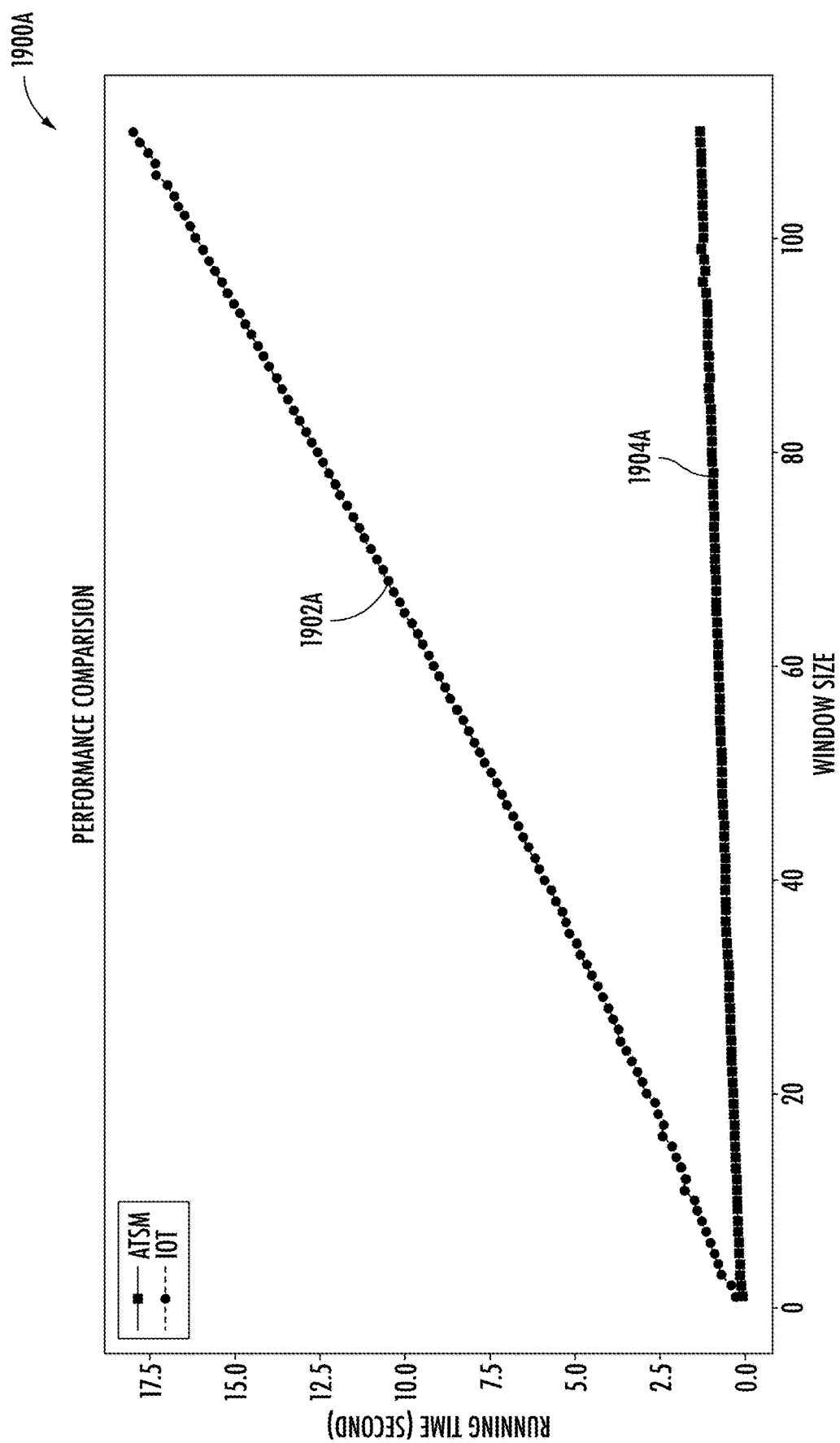
FIG. 19A is a graph of example experimental results obtained from application of both a conventional Hampel filtering process and the improved Hampel filtering process described herein to a dataset while incrementing the size of the sliding window, according to some embodiments of the present technology.

FIG. 19A is a graph of experimental results obtained from application of both a conventional Hampel filtering process and the improved Hampel filtering process described herein to a dataset while incrementing the size of the sliding window according to some implementations of the present disclosure. Specifically, the chart 1900A includes first results 1902A and second results 1904A. The first results 1902A are obtained by applying a conventional Hampel filtering process to a dataset while increasing a size of the sliding window of the Hampel filter. Similarly, the second results 1904A are obtained by applying the improved Hampel filtering process described herein to the same dataset as the sliding window size increases.

As illustrated, the difference between the first results 1902A and the second results 1904A demonstrates that the improved Hampel filtering process described herein provides substantial improvements in running time. In particular, the conventional Hampel filtering process used to collect the first results 1902A causes a substantial increase in running time based on the size of the sliding window. Conversely, as demonstrated by the second results 1904A, the running time for the improved Hampel filtering process is substantially less affected by the size of the sliding window. Overall, the second results collected using the improved Hampel filtering process demonstrate 50% to 70% improvements in speed compared to existing implementations.

Figure 19B:
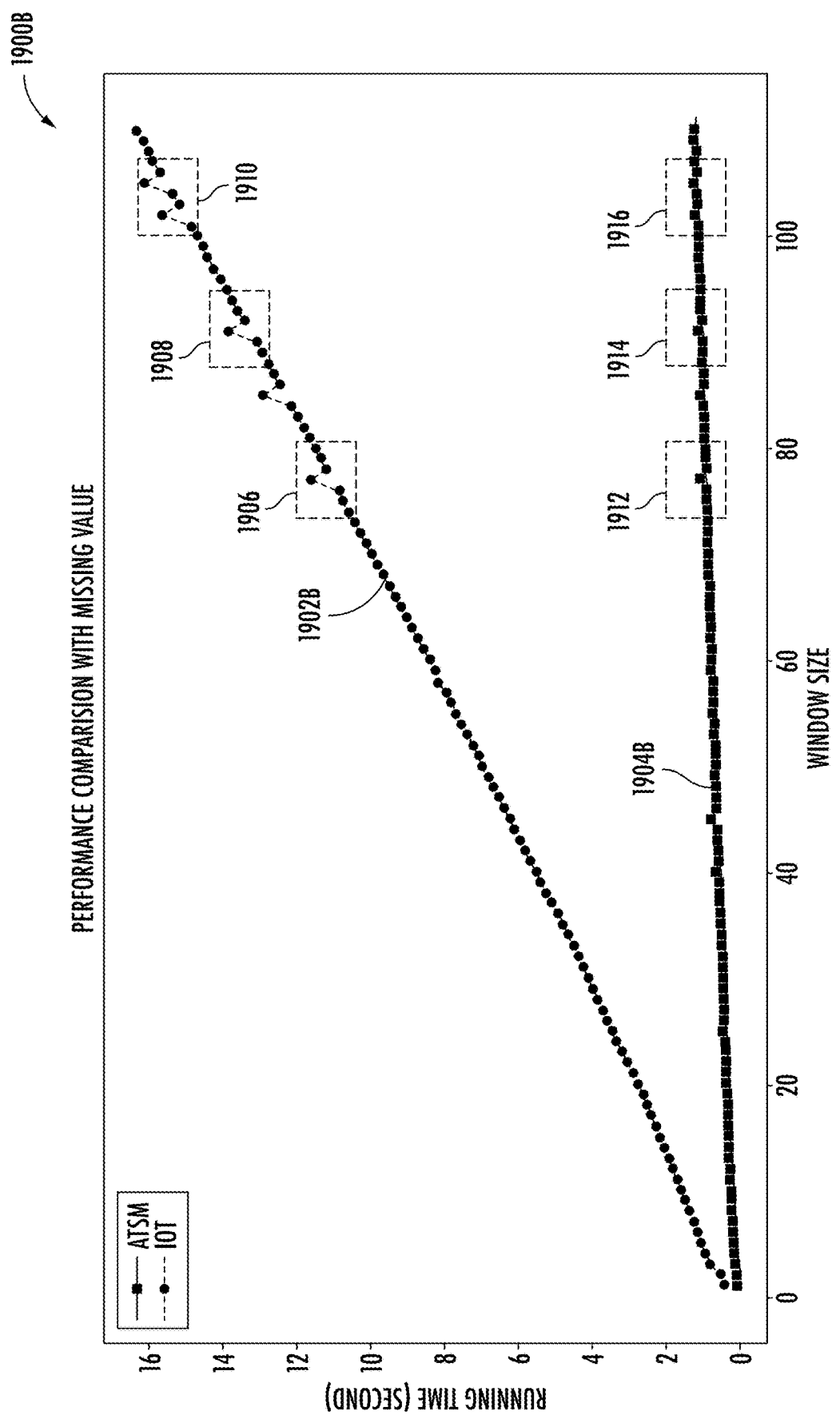
FIG. 19B is a graph of example experimental results from application of a conventional Hampel filtering process and the improved Hampel filtering process described herein to a dataset that includes null values while incrementing the size of the sliding window, according to some embodiments of the present technology.

FIG. 19B is a graph of experimental results obtained from application of both a conventional Hampel filtering process and the improved Hampel filtering process described herein to a dataset that includes null values while incrementing the size of the sliding window according to some implementations of the present disclosure. The chart 1900B includes first results 1902B and second results 1904B obtained by applying a conventional Hampel filtering process and the improved Hampel filtering process described herein to a dataset with null values while increasing a size of the sliding window of the Hampel filter, respectively. Like FIG. 19A, FIG. 19B demonstrates significant performance improvements between the improved Hampel filtering process and conventional implementations.

Specifically, the first results 1902B can be collected using conventional missing value handling techniques (e.g., replacing with an existing or prior value), while the second results 1904B can be collected using the method described with regards to FIG. 18. The differences between the first results 1902B at locations 1906, 1908, and 1910, and the second results 1904B at locations 1912, 1914, and 1916, demonstrate that the missing value handling technique used to collect the second results 1904B exhibits substantially superior performance to the conventional missing value handling techniques used to collect the first results 1902B.

Figure 20:
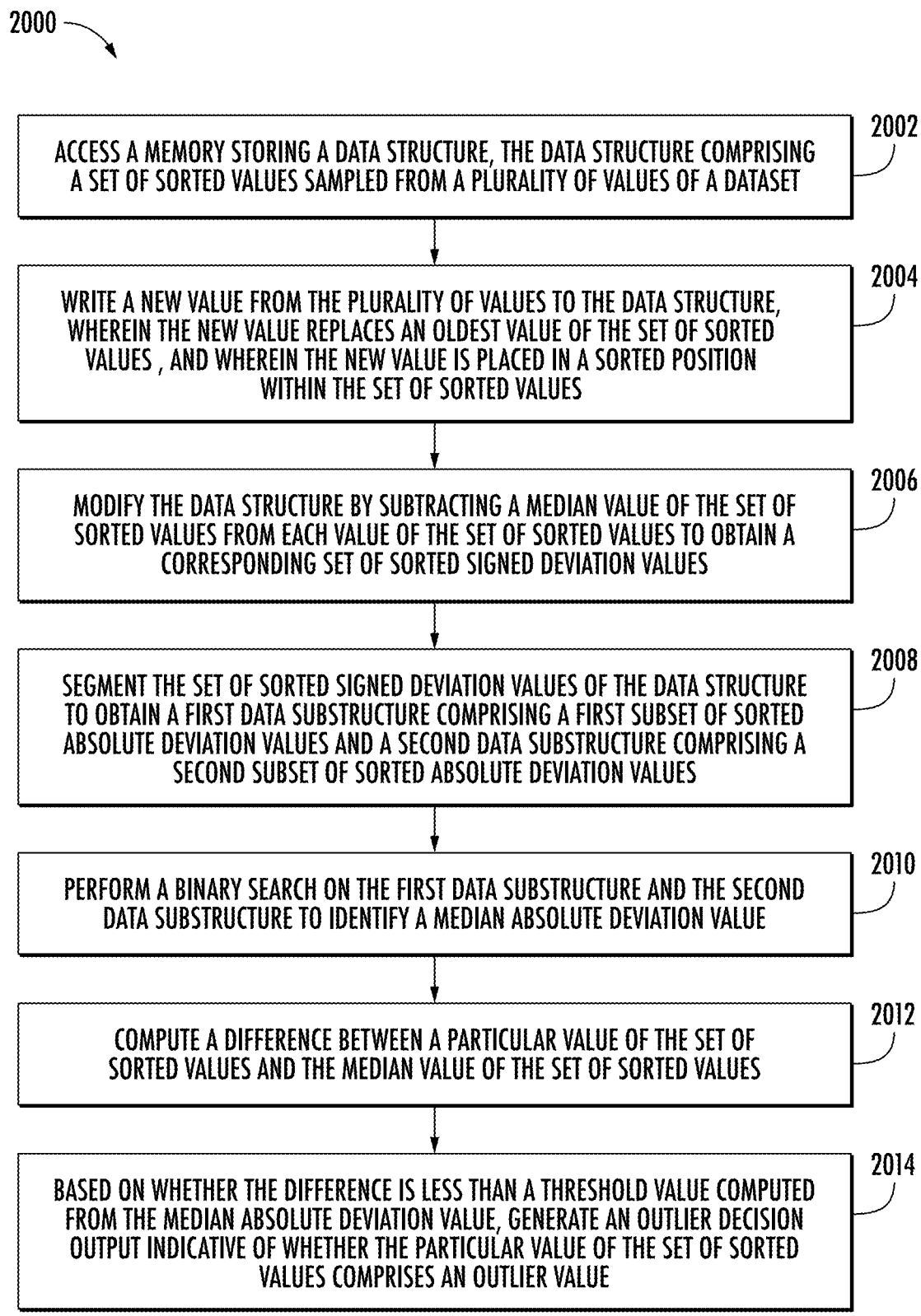
FIG. 20 is a flowchart diagram for an example method for an improved Hampel filtering process, according to some embodiments of the present technology.

FIG. 20 is a flowchart diagram for a method 2000 for an improved Hampel filtering process according to some implementations of the present disclosure. Although FIG. 20 depicts steps performed in a particular order for purposes of illustration and discussion, the methods of the present disclosure are not limited to the particularly illustrated order or arrangement. The various operations of the method 2000 can be omitted, rearranged, combined, and/or adapted in various ways without deviating from the scope of the present disclosure.

At 2002, the computing system can access a memory storing a data structure, the data structure comprising a set of sorted values sampled from a plurality of values of a dataset. In some implementations, prior to accessing the memory, the computing system can sample a set of unsorted values from a sliding window located at a first window position within the plurality of values of the dataset. The computing system can sort the set of unsorted values to obtain the set of sorted values.

At 2004, the computing system can write a new value from the plurality of values to the data structure. The new value can replace an oldest value of the set of sorted values. The position of the oldest value can be identified using a binary search. The new value can be inserted in a sorted position within the set of sorted values different than an original position of the oldest value.

In some implementations, prior to writing the new value, the computing system can sample a set of values from the plurality of values of the dataset. The computing system can sort the set of values to obtain the set of sorted values. In some implementations, the computing system can apply a Hampel filtering process to some other value of the set of sorted values different than the particular value to determine whether the other value of the set of sorted values comprises an outlier value.

In some implementations, to write the new value, the computing system can increment the sliding window from the first window position to a second window position adjacent to the first window position to select the new value. The sliding window at the first window position is centered at a value that immediately precedes the particular value within the plurality of values. The sliding window at the second window position is centered at the particular value.

In some implementations, to write the new value, the computing system can search the data structure to identify a first position of the oldest value within the data structure. The computing system can write the new value into the first position within the data structure. The new value can include an unsorted value in the first position. The computing system can move the new value from the first position to a second position within the data structure. The new value can include a sorted value in the second position. In some implementations, to move the new value, the computing system can perform a binary search operation to determine that the new value comprises a sorted value in the second position.

In some implementations, to write the new value, the computing system can determine that the oldest value is missing from the set of sorted values. The computing system can, responsive to determining that the oldest value is missing, modify the data structure to append a new position to the data structure subsequent to a final position of the set of sorted values. The new value can be placed at the new position. The computing system can sort the set of sorted values to move the new value to a position other than the position subsequent to the final position.

At 2006, the computing system can modify the data structure by subtracting a median value of the set of sorted values from each value of the set of sorted values to obtain a corresponding set of sorted signed deviation values.

At 2008, the computing system can segment the set of sorted signed deviation values of the data structure at a segmentation point to obtain a first data substructure that includes a first subset of sorted absolute deviation values and a second data substructure that includes a second subset of sorted absolute deviation values. The segmentation point can be positioned between a negative signed value and a non-negative value within the set of sorted signed deviation values.

In some implementations, to segment the set of sorted signed deviation values into the first subset of sorted absolute deviation values and the second subset of sorted absolute deviation values, the computing system can segment the set of sorted signed deviation values at the segmentation point to obtain a first subset of sorted signed deviation values and a second subset of sorted signed deviation values. The computing system can respectively compute the first subset of sorted absolute deviation values and the second subset of sorted absolute deviation values from the first subset of sorted signed deviation values and the second subset of sorted signed deviation values. Each value of the first subset of sorted signed deviation values can be a negative value. Each value of the second subset of sorted signed deviation values can be a non-negative value.

At 2010, the computing system can perform a binary search on the first data substructure and the second data substructure to identify a median absolute deviation value.

At 2012, the computing system can compute a difference between a particular value of the set of sorted values and the median value of the set of sorted values. The particular value can include a value from the dataset being evaluated for an outlier decision.

At 2014, based on whether the difference is less than a threshold value computed from the median absolute deviation value, the computing system can generate an outlier decision output indicative of whether the particular value of the set of sorted values comprises an outlier value. In some implementations, to generate the outlier decision output, the computing system can compute the threshold value by multiplying a user-configurable variable by the median absolute deviation value. In some implementations, prior to generating the outlier decision output, the computing system can access an input from a user that is indicative of the user-configurable variable (e.g., a number of standard deviations, etc.).

In some implementations, to compute the threshold value by multiplying the user-configurable variable by the median absolute deviation value, the computing system can compute the threshold value by multiplying the user-configurable variable by the median absolute deviation value by a particular scale factor associated with a particular data distribution type of the dataset. In some implementations, to do so, the computing system can compute a standard deviation for the set of sorted values by multiplying the median absolute deviation value by the particular scale factor. The computing system can compute the threshold value by multiplying the standard deviation by the user-configurable variable.

In some implementations, to compute the threshold value by multiplying the user-configurable variable by the particular scale factor associated with the particular data distribution type of the dataset, the computing system can compute the particular data distribution type for the dataset from a plurality of candidate data distribution types, each associated with a corresponding scale factor of a plurality of scale factors. The computing system can select the particular scale factor associated with the particular data distribution type from the plurality of scale factors. The particular data distribution type can include Gaussian distribution types, non-Gaussian distribution types, a Laplace data distribution type, an exponential data distribution type, a uniform data distribution type, a logistic data distribution type, etc.

In some implementations, for a plurality of iterations, the computing system can increment the sliding window from a current position to a new position adjacent to the current position to select a subsequent value to evaluate for the outlier decision. The computing system can perform the operations of accessing, writing, modifying, segmenting, performing, computing, and generating for the subsequent value to generate a new outlier decision for the subsequent value. In some implementations, the sliding window at the first window position includes the oldest value and excludes the new value. The sliding window at the second window position includes the new value and excludes the oldest value.

In some implementations, each of the values comprises a time-series observation comprising temporal information indicative of a time at which the time-series observation was observed. To write the new value, the computing system can compute the oldest value based on the temporal information associated with the oldest value.

In some implementations, based on the positive outlier decision output, the computing system can remove the particular value from the dataset. The computing system can train a machine-learned model using the dataset. Additionally, or alternatively, in some implementations, the computing system can modify a configuration of an Internet-of-Things device based at least in part on the removal of the particular value from the dataset. Additionally, or alternatively, in some implementations, the computing system can output, for display via a graphical user interface, an indication of a positive outlier decision output.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-program product tangibly embodied in a non-transitory machine-readable storage medium, the computer-program product including instructions operable to cause a computing device to perform operations, comprising:

accessing a memory storing a data structure, the data structure comprising a set of sorted values sampled from a plurality of values of a dataset;

writing a new value from the plurality of values to the data structure, wherein the new value replaces an oldest value of the set of sorted values, and wherein the new value is inserted in a sorted position within the set of sorted values different than an original position of the oldest value;

modifying the data structure by subtracting a median value of the set of sorted values from each value of the set of sorted values to obtain a corresponding set of sorted signed deviation values;

segmenting the set of sorted signed deviation values of the data structure at a segmentation point to obtain a first data substructure comprising a first subset of sorted absolute deviation values and a second data substructure comprising a second subset of sorted absolute deviation values, wherein the segmentation point is positioned between a negative signed value and a non-negative value within the set of sorted signed deviation values;

performing a binary search on the first data substructure and the second data substructure to identify a median absolute deviation value;

computing a difference between a particular value of the set of sorted values and the median value of the set of sorted values, wherein the particular value comprises a value from the dataset being evaluated for an outlier decision; and based on whether the difference is less than a threshold value computed from the median absolute deviation value, generating an outlier decision output indicative of whether the particular value of the set of sorted values comprises an outlier value.

2. The computer-program product of claim 1, wherein generating the outlier decision output comprises:
computing the threshold value by multiplying a user-configurable variable by the median absolute deviation value.

3. The computer-program product of claim 2, wherein computing the threshold value by multiplying the user-configurable variable by the median absolute deviation value comprises:
computing the threshold value by multiplying the user-configurable variable by the median absolute deviation value by a particular scale factor associated with a particular data distribution type of the dataset.

4. The computer-program product of claim 3, wherein computing the threshold value by multiplying the user-configurable variable by the median absolute deviation value and the particular scale factor comprises:
computing a standard deviation for the set of sorted values by multiplying the median absolute deviation value by the particular scale factor; and
computing the threshold value by multiplying the standard deviation by the user-configurable variable.

5. The computer-program product of claim 3, wherein computing the threshold value by multiplying the user-configurable variable by the particular scale factor associated with the particular data distribution type of the dataset comprises:
computing the particular data distribution type for the dataset from a plurality of candidate data distribution types, each associated with a corresponding scale factor of a plurality of scale factors; and
selecting the particular scale factor associated with the particular data distribution type from the plurality of scale factors.

6. The computer-program product of claim 5, wherein the particular data distribution type comprises:
an exponential data distribution type;
a laplace data distribution type;
a uniform data distribution type; or
a logistic data distribution type.

7. The computer-program product of claim 2, wherein, prior to generating the outlier decision output, the operations comprise:
accessing an input from a user that is indicative of the user-configurable variable.

8. The computer-program product of claim 1, wherein, prior to writing the new value from the plurality of values to the data structure, the operations comprise:
sampling a set of values from the plurality of values of the dataset; and
sorting the set of values to obtain the set of sorted values.

9. The computer-program product of claim 8, wherein sorting the set of values to obtain the set of sorted values further comprises:
applying a Hampel filtering process to some other value of the set of sorted values different than the particular value to determine whether the other value of the set of sorted values comprises an outlier value.

10. The computer-program product of claim 1, wherein, prior to accessing the memory storing the data structure, the operations comprises:
sampling a set of unsorted values from a sliding window located at a first window position within the plurality of values of the dataset; and
sorting the set of unsorted values to obtain the set of sorted values.

11. The computer-program product of claim 10, wherein writing the new value from the plurality of values to the data structure comprises:
incrementing the sliding window from the first window position to a second window position adjacent to the first window position to select the new value, wherein:
the sliding window at the first window position is centered at a value that immediately precedes the particular value within the plurality of values; and
the sliding window at the second window position is centered at the particular value.

12. The computer-program product of claim 11, wherein the operations further comprise: for a plurality of iterations:
incrementing the sliding window from a current position to a new position adjacent to the current position to select a subsequent value to evaluate for the outlier decision; and
performing the operations of accessing, writing, modifying, segmenting, performing, computing, and generating for the subsequent value to generate a new outlier decision for the subsequent value.

13. The computer-program product of claim 11, wherein:
the sliding window at the first window position includes the oldest value and excludes the new value; and
the sliding window at the second window position includes the new value and excludes the oldest value.

14. The computer-program product of claim 1, wherein each of the values comprises a time-series observation comprising temporal information indicative of a time at which the time-series observation was observed; and
wherein writing the new value from the plurality of values to the data structure comprises:
computing the oldest value based on the temporal information associated with the oldest value.

15. The computer-program product of claim 1, wherein writing the new value from the plurality of values to the data structure comprises:
searching the data structure to identify a first position of the oldest value within the data structure;
writing the new value into the first position within the data structure, wherein the new value comprises an unsorted value in the first position; and
moving the new value from the first position to a second position within the data structure, wherein the new value comprises a sorted value in the second position.

16. The computer-program product of claim 15, wherein moving the new value from the first position to the second position comprises:
performing a binary search operation to determine that the new value comprises a sorted value in the second position.

17. The computer-program product of claim 1, wherein generating the outlier decision output comprises:
based on the difference being greater than or equal to the threshold value computed from the median absolute deviation value, generating a positive outlier decision output indicating that the particular value of the set of sorted values comprises an outlier value.

18. The computer-program product of claim 17, wherein the operations further comprises:
based on the positive outlier decision output, removing the particular value from the dataset; and
training a machine-learned model using the dataset.

19. The computer-program product of claim 17, wherein the operations further comprise:

based on the positive outlier decision output, removing the particular value from the dataset; and modifying a configuration of an Internet-of-Things (IoT) device based at least in part on the removal of the particular value from the dataset.

20. The computer-program product of claim 17, wherein the operations further comprise:

outputting, for display via a graphical user interface, an indication of the positive outlier decision output.

21. The computer-program product of claim 1, wherein writing the new value from the plurality of values to the data structure comprises:

determining that the oldest value is missing from the set of sorted values;

responsive to determining that the oldest value is missing, modifying the data structure to append a new position to the data structure subsequent to a final position of the set of sorted values, wherein the new value is placed at the new position; and sorting the set of sorted values to move the new value to a position other than the position subsequent to the final position.

22. The computer-program product of claim 1, wherein segmenting the set of sorted signed deviation values into the first subset of sorted absolute deviation values and the second subset of sorted absolute deviation values comprises:

segmenting the set of sorted signed deviation values at the segmentation point to obtain a first subset of sorted signed deviation values and a second subset of sorted signed deviation values; and respectively computing the first subset of sorted absolute deviation values and the second subset of sorted absolute deviation values from the first subset of sorted signed deviation values and the second subset of sorted signed deviation values.

23. The computer-program product of claim 22, wherein each value of the first subset of sorted signed deviation values comprises a negative value, and wherein each value of the second subset of sorted signed deviation values comprises a non-negative value.

24. A system, comprising:

one or more data processors; and a non-transitory computer-readable storage medium containing instructions which, when executed on the one or more data processors, cause the one or more data processors to:

access a memory storing a data structure, the data structure comprising a set of sorted values sampled from a plurality of values of a dataset;

write a new value from the plurality of values to the data structure, wherein the new value replaces an oldest value of the set of sorted values, and wherein the new value is inserted in a sorted position within the set of sorted values different than an original position of the oldest value;

modify the data structure by subtracting a median value of the set of sorted values from each value of the set of sorted values to obtain a corresponding set of sorted signed deviation values;

segment the set of sorted signed deviation values of the data structure at a segmentation point to obtain a first data substructure comprising a first subset of sorted absolute deviation values and a second data substructure comprising a second subset of sorted absolute deviation values, wherein the segmentation point is positioned between a negative signed value and a non-negative value within the set of sorted signed deviation values;

perform a binary search on the first data substructure and the second data substructure to identify a median absolute deviation value;

compute a difference between a particular value of the set of sorted values and the median value of the set of sorted values, wherein the particular value comprises a value from the dataset being evaluated for an outlier decision; and based on whether the difference is less than a threshold value computed from the median absolute deviation value, generate an outlier decision output indicative of whether the particular value of the set of sorted values comprises an outlier value.

25. The system of claim 24, wherein, to generate the outlier decision output, the one or more data processors are to:

compute the threshold value by multiplying a user-configurable variable by the median absolute deviation value.

26. The system of claim 25, wherein, to compute the threshold value by multiplying the user-configurable variable by the median absolute deviation value, the one or more data processors are to:

compute the threshold value by multiplying the user-configurable variable by the median absolute deviation value by a particular scale factor associated with a particular data distribution type of the dataset.

27. The system of claim 26, wherein, to compute the threshold value by multiplying the user-configurable variable by the median absolute deviation value and the particular scale factor, the one or more data processors are to comprises:

compute a standard deviation for the set of sorted values by multiplying the median absolute deviation value by the particular scale factor; and compute the threshold value by multiplying the standard deviation by the user-configurable variable.

28. The system of claim 26, wherein, to compute the threshold value by multiplying the user-configurable variable by the particular scale factor associated with the particular data distribution type of the dataset, the one or more data processors are to:

compute the particular data distribution type for the dataset from a plurality of candidate data distribution types, each associated with a corresponding scale factor of a plurality of scale factors; and select the particular scale factor associated with the particular data distribution type from the plurality of scale factors.

29. The system of claim 26, wherein the particular data distribution type comprises:

an exponential data distribution type;

a laplace data distribution type;

a uniform data distribution type; or a logistic data distribution type.

30. A computer-implemented method, comprising:

accessing, by a computing system comprising one or more processor devices, a memory storing a data structure, the data structure comprising a set of sorted values sampled from a plurality of values of a dataset;

writing, by the computing system, a new value from the plurality of values to the data structure, wherein the new value replaces an oldest value of the set of sorted values, and wherein the new value is inserted in a sorted position within the set of sorted values different than an original position of the oldest value;

modifying, by the computing system, the data structure by subtracting a median value of the set of sorted values from each value of the set of sorted values to obtain a corresponding set of sorted signed deviation values;

segmenting, by the computing system, the set of sorted signed deviation values of the data structure at a segmentation point to obtain a first data substructure comprising a first subset of sorted absolute deviation values and a second data substructure comprising a second subset of sorted absolute deviation values, wherein the segmentation point is positioned between a negative signed value and a non-negative value within the set of sorted signed deviation values;

performing, by the computing system, a binary search on the first data substructure and the second data substructure to identify a median absolute deviation value;

computing, by the computing system, a difference between a particular value of the set of sorted values and the median value of the set of sorted values, wherein the particular value comprises a value from the dataset being evaluated for an outlier decision; and based on whether the difference is less than a threshold value computed from the median absolute deviation value, generating, by the computing system, an outlier decision output indicative of whether the particular value of the set of sorted values comprises an outlier value.

* * * * *

UNITED STATES PATENT AND TRADEMARK OFFICE
CERTIFICATE OF CORRECTION

PATENT NO. : 12,298,963 B1
APPLICATION NO. : 18/932008
DATED : May 13, 2025
INVENTOR(S) : Hongtao Hu and Mahesh V. Joshi It is certified that error appears in the above-identified patent and that said Letters Patent is hereby corrected as shown below:

In the Drawings

Figure 14 includes an incorrect value for the median 1427 and should be replaced by the attached.

In the Specification

Column 43, Line 8, "MAD value 1426 of 2" should be "MAD value 1426 of 3"
Columns 49-50, (the last line of the algorithm), "median = 1/2 * MAX" should be "median = 1/2 * (MAX" and ", array2[q]" should be ", array2[q]))".

Signed and Sealed this
Nineteenth Day of August, 2025

Coke Morgan Stewart
*Acting Director of the United States Patent and Trademark Office*